United States Patent
Okazaki

(10) Patent No.: US 8,036,676 B2
(45) Date of Patent: Oct. 11, 2011

(54) FREQUENCY SHARING METHOD, RECEIVING STATION AND TRANSMITTING STATION

(75) Inventor: Akihiro Okazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1064 days.

(21) Appl. No.: 11/816,234

(22) PCT Filed: Feb. 2, 2006

(86) PCT No.: PCT/JP2006/301761
§ 371 (c)(1),
(2), (4) Date: Sep. 11, 2007

(87) PCT Pub. No.: WO2006/085471
PCT Pub. Date: Aug. 17, 2006

(65) Prior Publication Data
US 2008/0186938 A1 Aug. 7, 2008

(30) Foreign Application Priority Data
Feb. 14, 2005 (JP) .................. 2005-036668

(51) Int. Cl.
*H04W 72/00* (2009.01)
(52) U.S. Cl. ........ 455/454; 370/343; 455/436; 455/437; 455/446
(58) Field of Classification Search .................. 370/329, 370/330, 341, 343; 455/447, 450–455, 464
See application file for complete search history.

(56) References Cited

U.S. PATENT DOCUMENTS

| | | | | |
|---|---|---|---|---|
| 5,276,908 A * | 1/1994 | Koohgoli et al. | ............. | 455/454 |
| 5,361,258 A * | 11/1994 | Arnold et al. | ................. | 370/330 |
| 5,708,969 A * | 1/1998 | Kotzin et al. | ................. | 455/423 |
| 5,893,033 A * | 4/1999 | Keskitalo et al. | ............. | 455/437 |
| 6,188,900 B1 * | 2/2001 | Ruiz et al. | ..................... | 455/436 |
| 6,389,080 B1 * | 5/2002 | Barnes | ......................... | 375/269 |
| 6,526,279 B1 * | 2/2003 | Dent | ............................ | 455/437 |
| 2001/0041594 A1 * | 11/2001 | Arazi et al. | .................... | 455/561 |
| 2005/0064832 A1 * | 3/2005 | Kogawa et al. | ............ | 455/168.1 |

FOREIGN PATENT DOCUMENTS

| | | |
|---|---|---|
| EP | 1 458 116 A2 | 9/2004 |
| JP | 3-235534 | 10/1991 |

(Continued)

OTHER PUBLICATIONS

A. S. Tannenbaum, "Computer Networks", XP002537203, Jan. 1, 1996, pp. 262-265.

(Continued)

*Primary Examiner* — Kent Chang
*Assistant Examiner* — Dinh Nguyen
(74) *Attorney, Agent, or Firm* — Oblon, Spivak, McClelland, Maier & Neustadt, L.L.P.

(57) ABSTRACT

In a frequency sharing radio system including a plurality of systems that share a specific frequency, upon establishment of a new system using a frequency that an existing system uses, a receiving station of the existing system receives a signal from a transmitting station of the existing system at a transmission frequency. The receiving station of the existing system transmits a beacon signal indicating a reception range thereof at the transmission frequency. A transmitting station of the new system detects a beacon signal transmitted from a receiving station of another system, and judges whether signal transmission is possible based on a result of the detection.

19 Claims, 19 Drawing Sheets

FOREIGN PATENT DOCUMENTS

| | | |
|---|---|---|
| JP | 7-298361 | 11/1995 |
| JP | 9-172405 | 6/1997 |
| JP | 2001-519978 | 10/2001 |
| JP | 2002 186019 | 6/2002 |
| JP | 2002 198867 | 7/2002 |
| JP | 2002 353878 | 12/2002 |
| JP | 2003-18074 | 1/2003 |
| JP | 2003 169367 | 6/2003 |
| JP | 2004 274765 | 9/2004 |
| JP | 2004-533158 | 10/2004 |
| JP | 2004 343509 | 12/2004 |
| JP | 2005-12683 | 1/2005 |
| WO | WO 98/36599 | 8/1998 |
| WO | WO 02/082751 A2 | 10/2002 |
| WO | WO 02/082751 A3 | 10/2002 |
| WO | WO 2004/015886 A1 | 2/2004 |

OTHER PUBLICATIONS

Hans-Jürgen Perz, et al., "Adjustable Transmission Power for Mobile Communications with Omnidirectional and Directional Antennas in an One-And Multi-Hop Environment", Vehicular Technology Conference, XP010037156, May 19, 1991, pp. 630-635.

* cited by examiner

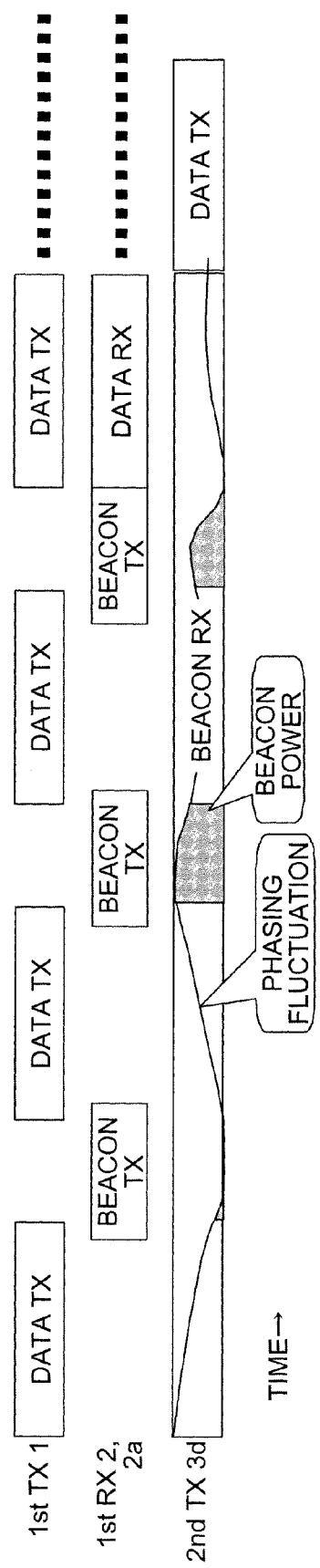

FREQUENCY →

FREQUENCY SHARING METHOD, RECEIVING STATION AND TRANSMITTING STATION

TECHNICAL FIELD

The present invention generally relates to a frequency sharing method for a frequency sharing radio system in which a plurality of radio systems shares the same frequency. The present invention specifically relates to frequency sharing method in establishing a new system while preventing interference with existing systems.

BACKGROUND ART

As an effective conventional technology for realizing effective use of frequency resources, there is, for example, a frequency sharing radio system. This is a method of sharing one frequency among a plurality of systems and performing communication using the frequency when the frequency is not used by other users.

A Patent Document 1 discloses a technology for realizing the frequency sharing radio system. In this Patent Document 1, a channel use state is checked by measuring interference between an own radio communication system and other radio communication systems and a channel is selected based on a result of the check to realize the frequency sharing radio system.

The following three methods can be cited as a method of using the frequency sharing radio system:
1. Frequency allocation to a single user
2. Opening a frequency band as a freely usable frequency band without allocating frequencies
3. Frequency allocation to a plurality of users with priority orders set for use In a frequency sharing radio system indicated by 2 above, when there is an existing system that is already using a frequency, a newly established system needs to prevent interference with the existing system. In a frequency sharing system indicated by 3 above, when an existing system has a priority order concerning frequency higher than that of a new system, the new system needs to prevent interference with the existing system.

Patent Document 1: Japanese Patent Application Laid-Open No. 2002-186019

DISCLOSURE OF INVENTION

Problem to be Solved by the Invention

However, in the conventional frequency sharing radio system, there is a problem in that, in some cases, regardless of the fact that an existing system is using a frequency, interference is not measured in a newly added system and the new system interferes with the existing system.

This problem is explained in detail below. For example, there is a first system as the existing system and a second system is newly established as the new system. In this case, the first system has a priority and the second system is required not to interfere with the first system. It is assumed that, in the first system, a first communication apparatus on a transmission side is transmitting a radio wave and a first communication apparatus on a reception side is receiving the radio wave. In this case, in the second system, it is necessary to check an availability state of frequencies to receive a radio wave, which is transmitted by a second communication apparatus on the transmission side, in a second communication apparatus on the reception side.

In this state, the second communication apparatus on the transmission side performs interference measurement to check whether a frequency is available. For example, when the first communication apparatus on the transmission side and the second communication apparatus on the transmission side are distant from each other, the radio wave of the first communication apparatus on the transmission side does not reach the second communication apparatus on the transmission side. Thus, the second communication apparatus on the transmission side cannot detect interference. As a result, the second communication apparatus on the transmission side judges that other systems are not using the frequency measured and transmits a radio wave to the second communication apparatus on the reception side at that frequency.

However, in the above case, for example, when the first communication apparatus on the reception side is present between the first communication apparatus on the transmission side and the second communication apparatus on the transmission side, it is likely that the first communication apparatus on the reception side receives the radio wave of the second communication apparatus on the transmission side together with the radio wave of the first communication apparatus on the transmission side. In other words, it is likely that the radio wave of the second communication apparatus on the transmission side becomes interference for the first communication apparatus on the reception side. In this case, the second system interferes with the first system.

The present invention has been achieved to solve the above problems in the conventional technology and it is an object of the present invention to provide a frequency sharing method for establishing, in a frequency sharing radio system, a new radio system to prevent the new radio system from affecting existing radio systems.

Means for Solving Problem

To solve the problems and achieve the object mentioned above, according to the present invention, a frequency sharing method for a frequency sharing radio system in which a plurality of systems shares a specific frequency, includes, upon newly establishing a system (a new system) using the same frequency that an existing system already uses, a beacon transmitting step in which, when a receiving station of the existing system receives a signal from a transmitting station of the existing system at a specific transmission frequency, the receiving station transmits a signal (a beacon signal) indicating a reception range thereof at the transmission frequency, and a beacon receiving step in which a transmitting station of the new system detects a beacon signal transmitted by a receiving station of another system and judges whether signal transmission is possible based on a result of the detection.

According to the present invention, the transmitting station of the new system detects the transmission signal and the beacon signal of the existing system. In other words, the transmitting station of the new system detects a reception range of the receiving station of the existing system.

Effect of the Invention

According to the present invention, since it is possible to estimate an influence on the existing system caused by the transmission performed by the transmitting station of the new system, it is possible to prevent interference with the existing system. In other words, there is an effect that it is possible to establish the new system without affecting the existing system.

BRIEF DESCRIPTION OF DRAWINGS

FIG. 1-2 is a schematic diagram of a transmission range of a first TX and a reception range of a first RX.

FIG. 1-3 is a diagram of an example structure of the first TX.

FIG. 1-4 is a diagram of an example structure of the first RX.

FIG. 1-5 is a diagram of an example structure of a second TX.

FIG. 1-6 is a diagram of an example structure of a second RX.

FIG. 2-1 is a diagram of an example structure of a frequency sharing radio system according to a second embodiment of the present invention.

FIG. 2-2 is a diagram of an example structure of a first RX.

FIG. 3-1 is a diagram of a structure of a beacon signal as a salient feature of a third embodiment of the present invention.

FIG. 3-2 is a diagram of an example structure of a second TX.

FIG. 4-1 is a diagram of an example structure of a frequency sharing radio system according to a fourth embodiment of the present invention.

FIG. 4-2 is a diagram of an example structure of a second TX.

FIG. 5-1 is a diagram of an example structure of a frequency sharing radio system according to a fifth embodiment of the present invention.

FIG. 5-2 is a diagram for explaining fluctuation in beacon signals due to movement of a second TX.

FIG. 5-3 is a diagram of an example structure of the second TX.

FIG. 6-1 is a diagram of an example structure of a frequency sharing radio system according to a sixth embodiment of the present invention.

FIG. 6-2 is a diagram for explaining fluctuation in beacon signals received by a second TX.

FIG. 6-3 is a diagram of an example structure of a first RX.

FIG. 7-1 is a diagram of an example structure of a frequency sharing radio system according to a seventh embodiment of the present invention.

FIG. 7-2 is a diagram of an example structure of a first RX.

FIG. 7-3 is a diagram of an example structure of a first RX.

FIG. 8-1 is a diagram for explaining an example of processing for estimating electric power of a beacon signal as a salient feature of an eighth embodiment of the present invention.

FIG. 8-2 is a diagram of an example structure of a second TX.

FIG. 9-1 is a diagram of an example of spectra of a beacon signal and a transmission signal as a salient feature of a ninth embodiment of the present invention.

FIG. 9-2 is a diagram of an example structure of a second TX.

FIG. 10-1 is a diagram of an example of spectra of a beacon signal and a transmission signal as a salient feature of a tenth embodiment of the present invention.

FIG. 10-2 is a diagram of an example structure of a second TX.

FIG. 11-1 is a diagram of an example of spectra of a beacon signal and a transmission signal as a salient feature of an eleventh embodiment of the present invention.

FIG. 11-2 is a diagram of an example structure of a second TX.

FIG. 12-1 is a diagram of an example structure of a frequency sharing radio system according to a twelfth embodiment of the present invention.

FIG. 12-2 is a diagram of an example structure of a first RX.

EXPLANATIONS OF LETTERS OR NUMERALS

Figure 1:
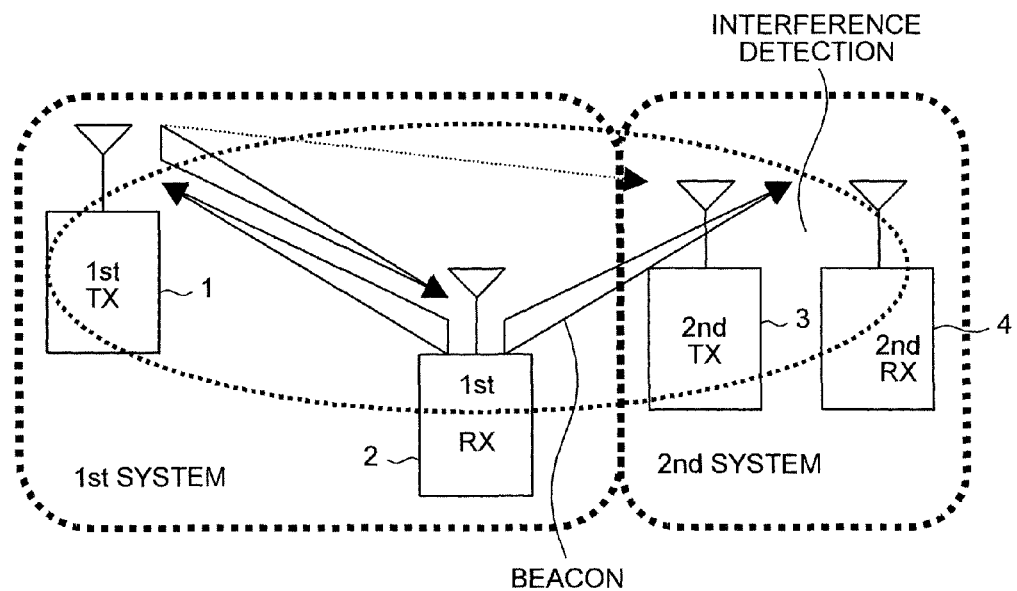
FIG. 1-1 is a diagram of an example structure of a frequency sharing radio system according to a first embodiment of the present invention.

1 First TX
1-A First A TX
1-B First B TX
2, 2*a*-1, 2*a*-2, 2*a*, 2*e*-1, 2*e*-2, 2*f*, 2*k*-1, 2*k*-2 First RX
2-A First A RX
2-B First B RX
3, 3*d*, 5 Second TX
4, 6 Second RX
11 Transmission-control circuit
12 Modulation circuit
15-1, 15-2 First beacon station
21 Demodulation circuit
22 Power-detection circuit
23, 23*a*, 23*e*, 23*f* Beacon-control circuit
24 Beacon-generation circuit
25*a* Transmission-power control circuit
26*e* Initial-phase applying circuit
27*f* Directional antenna
28*f* Antennas
29*f* Reception-antenna control circuit
30*f* Transmission-antenna control circuit
31, 31*b*, 31*c* Demodulation circuit
32, 32*c* Power-detection circuit
32*g* $f_k$ power-detection circuit
33, 33*b*, 33*c*, 33*h*, 33*i*, 33*j* Transmission-control circuit
34 Modulation circuit
35*c*, 35*h* Band splitting circuit
36*d* Power averaging circuit
37*g* $f_x$ power-estimation circuit
38*h* Band combining circuit
39*i* Power adding circuit
40*j* Band-estimation circuit
41 Demodulation circuit

BEST MODE(S) FOR CARRYING OUT THE INVENTION

Exemplary embodiments of a frequency sharing radio system according to the present invention are explained in detail below with reference to the accompanying drawings. The present invention is not limited by the embodiments.

First Embodiment

FIG. 1-1 is a diagram of an example structure of a frequency sharing radio system according to a first embodiment of the present invention. In FIG. 1-1, a first system represents an existing system and a second system represents a newly established system using the same frequency. A first TX 1 and a first RX 2 represent a transmitting station and a receiving station in the first system, respectively. A second TX 3 and a second RX 4 represent a transmitting station and a receiving station in the second system, respectively.

In the frequency sharing radio system according to this embodiment, the second system as the new system is established without affecting the first system as the existing system. In other words, in the frequency sharing radio system according to this embodiment, a transmission signal of the second TX 3 is prevented from interfering with the first RX 2 of the first system.

The operation of the frequency sharing radio system according to this embodiment are explained referring to FIG. 1-1. In the first system, when the first RX 2 receives a signal from the first TX 1 (the first system is established), the first RX 2 transmits a signal indicating a reception range thereof at a transmission frequency of the first TX 1. This signal is hereinafter referred to as a beacon signal. The transmission signal of the first TX 1 and the beacon signal of the first RX 2 are multiply transmitted using, for example, time multiplexing.

On the other hand, in the second system, the second TX 3 performs interference detection over a specific period to transmit a signal of the second system. For example, the second TX 3 detects a transmission signal of a transmitting station and a beacon signal of a receiving station in another system by performing reception for a predetermined period. The second TX 3 estimates an influence on the first TX and the first RX 2 in the case of transmission in a location thereof and judges whether the transmission is possible. For example, the second TX 3 transmits, using a frequency with sufficiently small reception power, a signal that does not affect the first system and has sufficiently small transmission power and the second RX 4 receives the signal from the second TX 3.

Figures 1, 2:
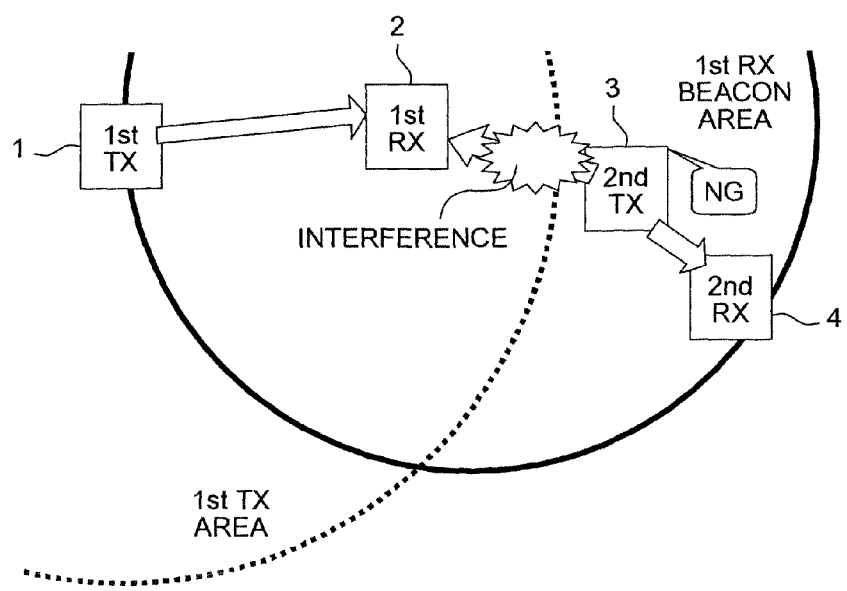

FIG. 1-2 is a schematic diagram of a transmission range of the first TX 1 and a reception range of the first RX 2 in the first system. A circle indicated by a broken line is the transmission range of the first TX 1 (a first TX area) and a circle indicated by a solid line is the reception range of the first RX 2 (a first RX beacon area). In FIG. 1-2, the second TX 3 of the second system is present in the reception range of the first RX 2, i.e., when the second TX 3 transmits a signal, the signal interferes with the first RX 2. Thus, for example, transmission is not to be performed.

FIGS. 1-3 to 1-6 are diagrams of an example structure of the first TX 1, the first RX 2, the second TX 3, and the second RX 4, respectively.

Figures 1, 2, 3:
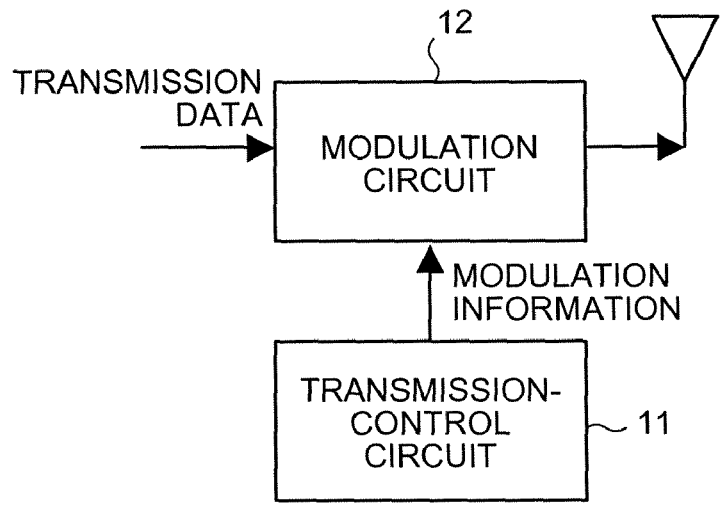

In the first TX 1 shown in FIG. 1-3, a transmission-control circuit 11 outputs information on modulation adopted in the own system (modulation information) to a modulation circuit 12. The modulation circuit 12 modulates transmission data based on the modulation information received and creates a transmission signal.

In the first RX 2 shown in FIGS. 1-4, a demodulation circuit 21 outputs a reception signal to a power-detection circuit 22 and outputs reception data after demodulation to a beacon-control circuit 23. The power-detection circuit 22 detects electric power of the reception signal and outputs reception-power information to the beacon-control circuit 23. The beacon-control circuit 23 creates beacon information based on the reception data and the reception-power information and outputs the beacon information to a beacon-generation circuit 24. For example, when the own station receives data and the reception-power information exceeds a predetermined threshold, the beacon-control circuit 23 creates beacon information for a beacon transmission instruction. The beacon-generation circuit 24 intermittently transmits, based on the beacon information, a beacon signal of a format identical to the transmission signal of the own system at a reception frequency.

In the second TX 3 shown in FIG. 1-5, a demodulation circuit 31 demodulates a beacon signal of an existing system and outputs the beacon signal to a power-detection circuit 32. The power-detection circuit 32 detects electric power of the beacon signal and outputs beacon-power information to a transmission-control circuit. The transmission-control circuit 33 creates, based on the beacon-power information, transmission-control information for a transmission possibility instruction and outputs the transmission-control information to a modulation circuit 34. The modulation circuit 34 modulates transmission data based on the transmission-control information and transmits a signal after the modulation.

In the second RX 4 shown in FIG. 1-6, a demodulation circuit 41 receives a signal from the transmitting station of the own system and demodulates the signal.

As described above, in this embodiment, the transmitting station of the second system detects the transmission signal and the beacon signal of the first system. In other words, in addition to detection of a signal transmitted by the transmitting station of the first system, the transmitting station of the second system further detects the reception range of the receiving station of the first system. Consequently, it is possible to estimate an influence on the first system caused by the transmission performed by the transmitting station of the second system. Thus, it is possible to prevent interference with the first system. In other words, according to the above-mentioned processing, it is possible to establish the second system without affecting the first system.

Second Embodiment

FIG. 2-1 is a diagram of an example structure of a frequency sharing radio system according to a second embodiment of the present invention. In FIG. 2-1, a first TX 1, a first RX 2a-1, and a first RX 2a-2 represent an existing system (a first system) and a second TX 3, a second RX 4, a second TX 5, and a second RX 6 represent a newly established system (a second system) using the same frequency. A transmission signal transmitted from the first TX 1 is received by a plurality of first RXs, the first RX 2a-1 and the first RX 2a-2. In this embodiment, it is assumed that, in the new system, communication is performed between the second TX 3 and the second RX 4 and between the second TX 5 and the second RX 6.

In the above-mentioned system configuration, in this embodiment, a receiving station further has a function of controlling electric power of a beacon signal according to reception power of a transmitting station from the own system in addition to the processing in the first embodiment described above.

The operation of the frequency sharing radio system according to this embodiment are explained referring to FIG. 2-1. When the first RX 2a-1 and the first RX 2a-2 successfully receive a signal of the first TX 1 (the first system is established), the first RX 2a-1 and the first RX 2a-2 transmit beacon signals corresponding to reception power of the signal at a transmission frequency of the first TX 1. In this case, as shown in FIG. 2-1, since the reception power of the signal transmitted by the first TX 1 is small in the first RX 2a-1, the first RX 2a-1 judges that a distance from the first TX 1 is large and transmits the beacon signal using sufficiently large electric power receivable in the first TX 1. Therefore, a reception range of the first RX 2a-1 (an RX 2a-1 beacon area) is wide. On the other hand, since the reception power of the signal transmitted by the first TX 1 is large in the first RX 2a-2, the first RX 2a-2 judges that a distance from the first TX 1 is small and transmits the beacon signal using small electric power sufficiently receivable in the first TX 1. Therefore, a reception range of the first RX 2a-2 (an RX 2a-2 beacon area) is narrow.

According to the operation of the first system, since the second TX 3 of the second system is present in the reception range of the first RX 2a-1, the second TX 3 cannot transmit a signal. On the other hand, since the second TX 5 of the second system is present outside the reception ranges of the first RX 2a-1 and the first RX 2a-2, the second TX 5 can transmit a signal.

FIG. 2-2 is a diagram of an example structure of the first RX 2a-1 and the first RX 2a-2. Other apparatus structures are the same as those described above in the first embodiment. In the structure of the first RX 2a-1 and the first RX 2a-2, like reference characters refer to components corresponding to those of the first RX 2 described above, and explanations thereof are omitted.

In FIG. 2-2, a beacon-control circuit 23a creates transmission-power information based on reception data and reception-power information in addition to the processing in the first embodiment described above. For example, when reception power is large in the first RX 2a (2a-1, 2a-2) of the first system, the first RX 2a has high resistance against interference. Thus, the beacon-control circuit 23a reduces transmission power of a beacon signal and narrows a reception range indicated to the transmitting station of the second system using the beacon signal. On the other hand, when reception power is small in the first RX 2a, the first RX 2a has low resistance against interference. Thus, the beacon-control circuit 23a increases transmission power of a beacon signal and widens a reception range indicated using the beacon signal. In other words, in this embodiment, by appropriately controlling transmission power of a beacon signal, the receiving station of the first system transmits a beacon signal for securing a necessary minimum reception range.

A transmission-power control circuit 25a applies, based on the transmission-power information output from the beacon-control circuit 23a, transmission-power control to a beacon signal output from the beacon-generation circuit 24 and transmits the beacon signal with appropriate electric power.

As described above, in this embodiment, in addition to the feature of the first embodiment described above, the receiving station of the first system further performs transmission-power control for a beacon signal according to reception power of a signal transmitted by the transmitting station of the own system and transmits a beacon signal of appropriate electric power. Consequently, it is possible to set a reception range indicated by the beacon signal of the receiving station of the first system to a necessary minimum range, and thus, it is possible to realize a more efficient frequency sharing radio system in establishing the second system.

Third Embodiment

FIG. 3-1 is a diagram of a structure of a beacon signal as a salient feature of a third embodiment of the present invention. In FIG. 3-1, a beacon signal is, for example, a signal obtained by modulating beacon information formed of modulation information including a modulation multi-value number, transmission-power information, priority information of the own system, and the like. This embodiment is characterized in that a signal obtained by modulating the beacon information is used as a beacon signal. In an explanation of this embodiment, the beacon signal is applied to the structure of the first or second embodiment described above.

The operation of the frequency sharing radio system according to this embodiment are explained. In the first or second embodiment described above, the first RX (2, 2a-1, 2a-2) transmits the beacon signal shown in FIG. 3-1 as a beacon signal. The second TX 3 demodulates the beacon signal and obtains the beacon information. Since the modulation information, the transmission-power information, the priority information, and the like are included in the beacon information, the second TX 3 obtains information on the system to which the first RS belongs. For example, it is possible to learn a modulation multi-value number used in the first system and predict robustness against interference from the modulation information. It is possible to predict transmission power allowed to the second TX 3 from the transmission-power information. It is possible to obtain a system priority of the first system from the priority information and it is possible to judge whether transmission is possible according to comparison with a priority of the own system.

The operation of the respective apparatuses in the frequency sharing radio system according to this embodiment are explained. Like reference characters refer to components corresponding to those described above in the first or second embodiment, and explanations thereof are omitted. In the following, processing different from that in the first or second embodiment described above is explained.

The beacon-control circuits (23, 23a) shown in FIGS. 1-4 and 2-2 notify the beacon-generation circuit 24 of, for example, the modulation information, the transmission-power information, and the priority information as beacon information in addition to a beacon transmission instruction. The beacon-generation circuit 24 transmits a signal obtained by modulating the beacon information as a beacon signal.

FIG. 3-2 is a diagram of an example structure of the second TX 3. A demodulation circuit 31b demodulates a beacon signal and notifies the transmission-control circuit 33 of beacon information extracted. For example, modulation information, transmission-power information, priority information, and the like are included in the beacon information. The transmission-control circuit 33b creates transmission-control information for more accurate transmission-possibility judgment and transmission-power control based on, in addition to beacon-power information, the beacon information including the modulation information, the transmission-power information, and the priority information. For example, it is possible to obtain a noise resistance ability in an existing receiving station from the modulation information, obtain reception power in the existing receiving station from the transmission-power information, and obtain a priority of an existing system from the priority information.

As described above, in this embodiment, the receiving station of the first system notifies other stations present in the reception range of information on the system to which this receiving station belongs. Consequently, it is possible to transmit system information for each beacon signal and realize a frequency sharing radio system that has adaptability allowing a change of system information for each beacon.

Fourth Embodiment

Figures 1, 2, 3, 4:
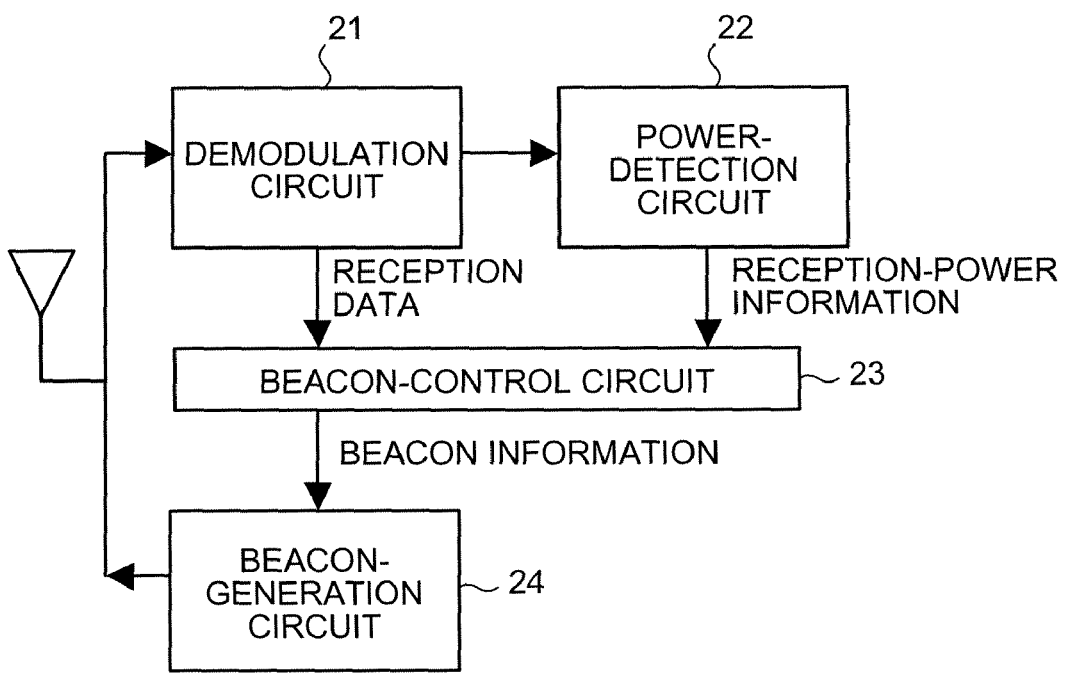

FIG. 4-1 is a diagram of an example structure of a frequency sharing radio system of a fourth embodiment of the present invention. A first A TX 1-A, a first A RX 2-A, a first B TX 1-B, and a first B RX 2-B each represent an existing system (a first system), and a second TX 3c and a second RX 4 each represent a newly established system (a second system). The first A TX 1-A and the first B TX 1-B perform transmission at frequencies $f_1$ and $f_2$, respectively. Like reference characters refer to components corresponding to those described above in the first, second, or third embodiment, and explanations thereof are omitted. The first A TX 1-A and the first B TX 1-B perform the same processing as that of the first TX according to the first, second, or third embodiment described above. The first A RX 2-A and the first B RX 2-B perform the same processing as that of the first RX in the first, second, or third embodiment described above.

In this embodiment, the second TX of the second system receives beacons in a plurality of frequency bands and performs transmission-possibility judgment and channel selection in addition to the processing in the first, second, or third embodiment described above.

The operation of the frequency sharing radio system according to this embodiment are explained. The first A TX 1-A and the first B TX 1-B transmit signals at the frequencies $f_1$ and $f_2$, respectively. The first A RX 2-A and the first B RX 2-B receive the signals of the frequencies $f_1$ and $f_2$ and transmit beacon signals at the frequencies $f_1$ and $f_2$. On the other hand, the second TX 3c receives the beacon signals transmitted at the frequencies $f_1$ and $f_2$ and estimates influences on a first A system and a first B system at the frequencies $f_1$ and $f_2$. The second TX 3c establishes the second system using a usable frequency based on the estimation.

For example, in FIG. 4-1, the second TX 3c is in a reception range of the first A RX 2-A but is on the outside of a reception range of the first B RX 2-B. Therefore, the second TX 3c judges that transmission at the frequency $f_1$ is impossible and judges that transmission at the frequency $f_2$ is possible.

FIG. 4-2 is a diagram of an example structure of the second TX 3c. The second TX 3c is characterized in that the second TX 3c includes a band splitting circuit 35c that subjects a reception signal to band splitting and a transmission-control circuit 33c outputs transmission-frequency information in addition to transmission-control information. Like reference characters refer to components corresponding to those described above in the first, second, or third embodiment, and explanations thereof are omitted. In the following, processing different from that in the first, second, or third embodiment is explained.

The band splitting circuit 35c subjects a reception signal to band splitting and separates beacon signals transmitted at a plurality of frequencies. A demodulation circuit 31c demodulates a plurality of beacon signals split by the band splitting circuit 35c, and outputs the beacon signals to a power-detection circuit 32c.

The power-detection circuit 32c detects electric power of the beacon signals received from the demodulation circuit 31c, and outputs beacon-power information to the transmission-control circuit 33c. The transmission-control circuit 33c creates transmission-control information and transmission-frequency information based on a plurality of pieces of beacon-power information and outputs the transmission-control information and the transmission-frequency information to the modulation circuit 34. As an operation of the transmission-control circuit 33c, for example, it is conceivable to set a frequency with lowest beacon power as transmission-frequency information. When there is a plurality of usable frequencies, it is conceivable to perform communication using the frequencies.

As described above, in this embodiment, the transmitting station of the second system is capable of receiving beacon signals in a plurality of frequency bands and performs transmission-possibility judgment and frequency selection. Consequently, it is possible to realize a more efficient frequency sharing radio system.

Fifth Embodiment

Figures 1, 2, 3, 4, 5:
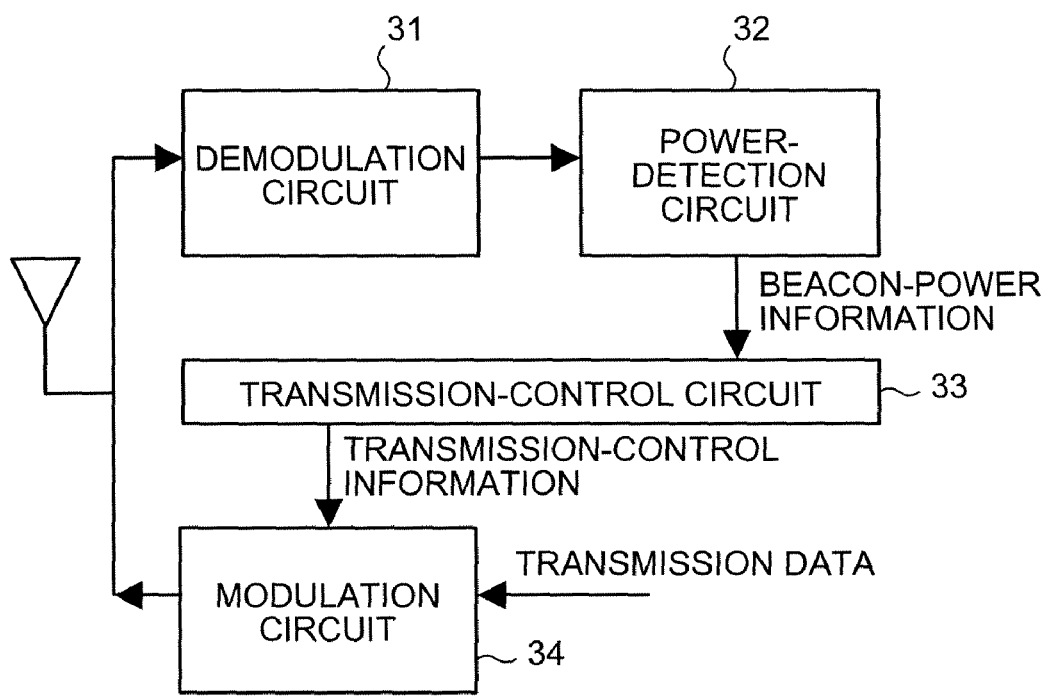

FIG. 5-1 is a diagram of an example structure of a frequency sharing radio system according to a fifth embodiment of the present invention. In FIG. 5-1, it is assumed that the frequency sharing radio system operates in an environment in which a multi-path is generated and a phasing zone is formed. In this embodiment, a second TX 3d moves in the phasing zone. The respective apparatuses constituting the first system and the second RX 4 of the second system perform the same processing as that in the first, second, or third embodiment described above.

In this embodiment, the second TX 3d of the second system further receives beacon signals a plurality of times and detects peak power of the beacon signals in addition to the processing in the first to fourth embodiments.

The operation of the frequency sharing radio system according to this embodiment are explained. Beacon signals transmitted from the first RX (2, 2a-1, 2a-2) of the first system form a phasing zone near the second TX 3d because of a multi-path environment. When the second TX 3d moves in this phasing zone, the beacon signals output by the first RX fluctuate depending on a position of the second TX 3d.

FIG. 5-2 is a diagram for explaining the fluctuation in the beacon signals due to the movement of the second TX 3d. In a beacon signal of a first time, reception power is hardly obtained because of fall of phasing. However, in beacon signals of second and third times, reception power is obtained. It is seen that, in such an environment, a condition that makes it impossible to receive the beacon signals transmitted from the first RX occurs. Therefore, in this embodiment, the second TX 3d detects the first RX by receiving the beacon signals a plurality of times and detecting the peak power of the beacon signals.

FIG. 5-3 is a diagram of an example structure of the second TX 3d. The second TX 3d is characterized by including a power averaging circuit 36d. Like reference characters refer to components corresponding to those in the second TX according to the first to fourth embodiments described above, and explanations thereof are omitted. In the following, processing different from that in the first to fourth embodiments described above is explained.

The power averaging circuit 36d averages beacon power detected by the power-detection circuit 32. Concerning a method of averaging, for example, a method of detecting peaks of a plurality of beacon signals, a method of calculating a moving average of a plurality of beacon signals, and the like are conceivable. Consequently, even when beacon power fluctuates temporally, it is possible to stably detect the presence of the first RX of the first system.

As described above, in this embodiment, the transmitting station of the second system performs beacon-signal detection a plurality of times and averages results of the beacon-signal detection. Consequently, even when beacon signals fluctuating over time are received, the transmitting station of the second system can detect the receiving station of the first system without being affected by the fluctuation in the beacon signals. Thus, it is possible to prevent interference with the first system.

Sixth Embodiment

Figures 1, 2, 3, 4, 5, 6:
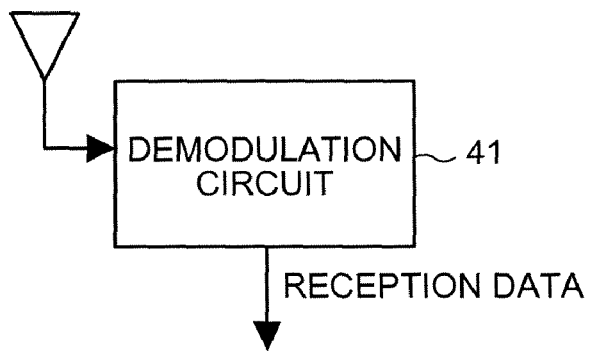
Figures 1, 2:
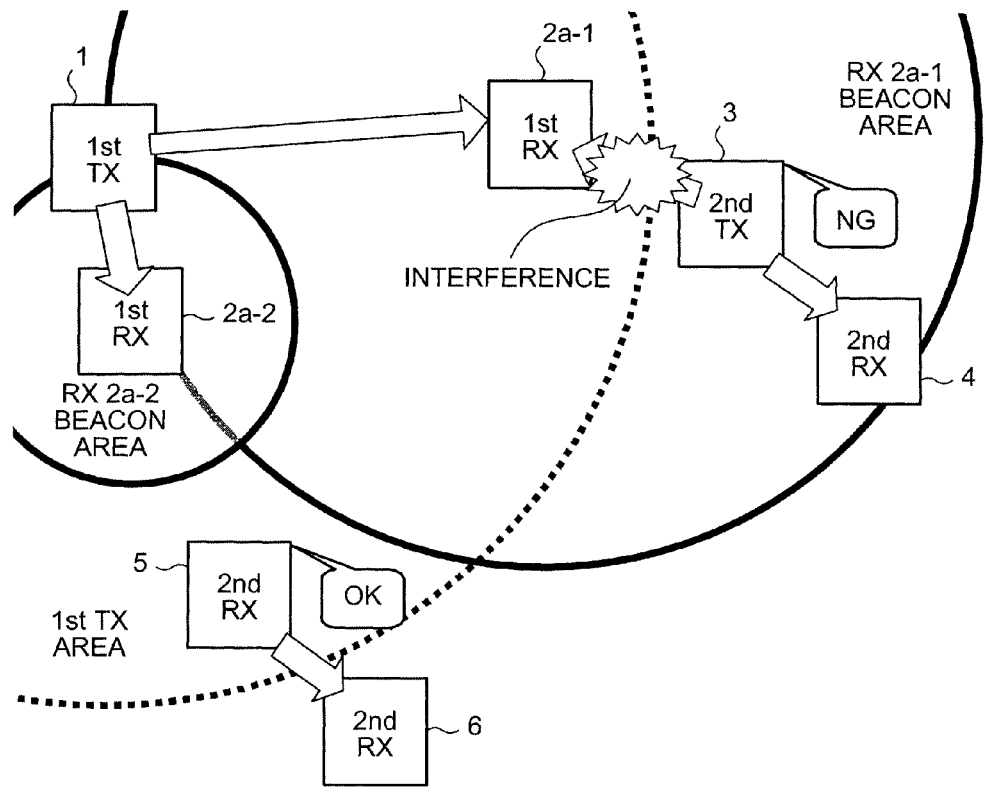
Figure 2:
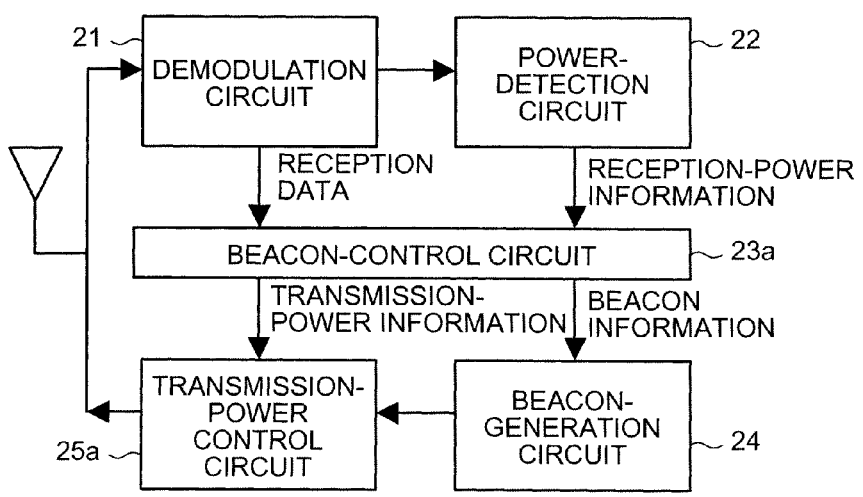
Figures 1, 3:
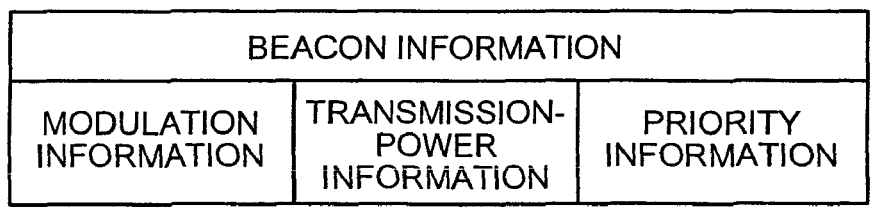
Figures 2, 3:
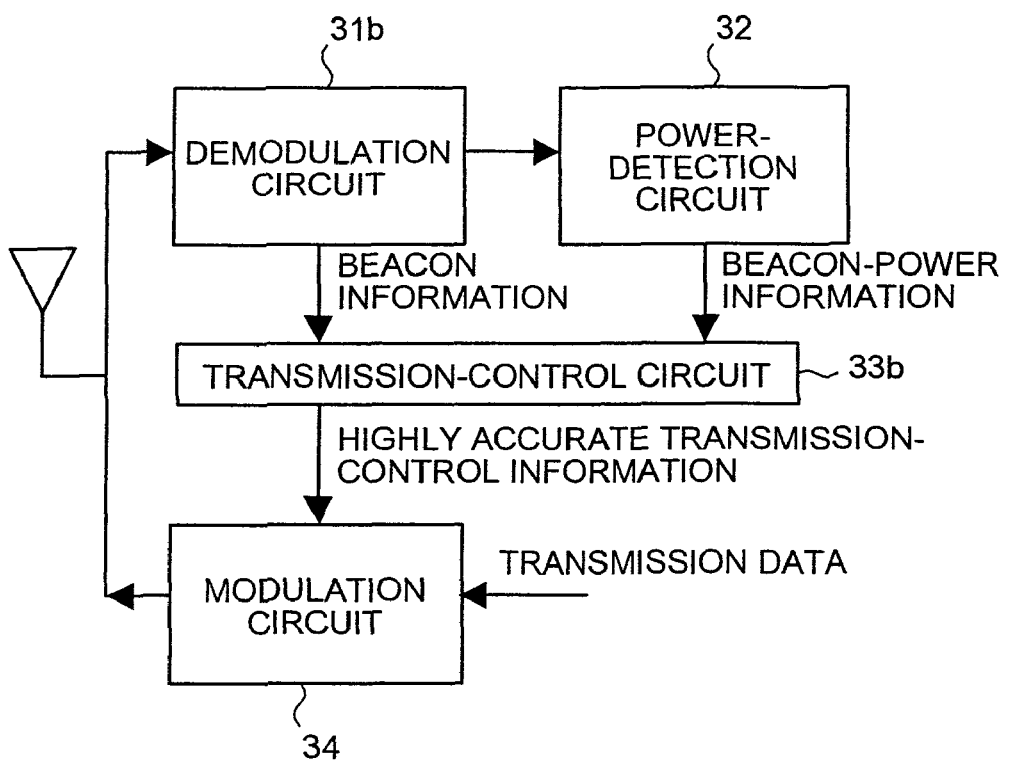
Figures 1, 4:
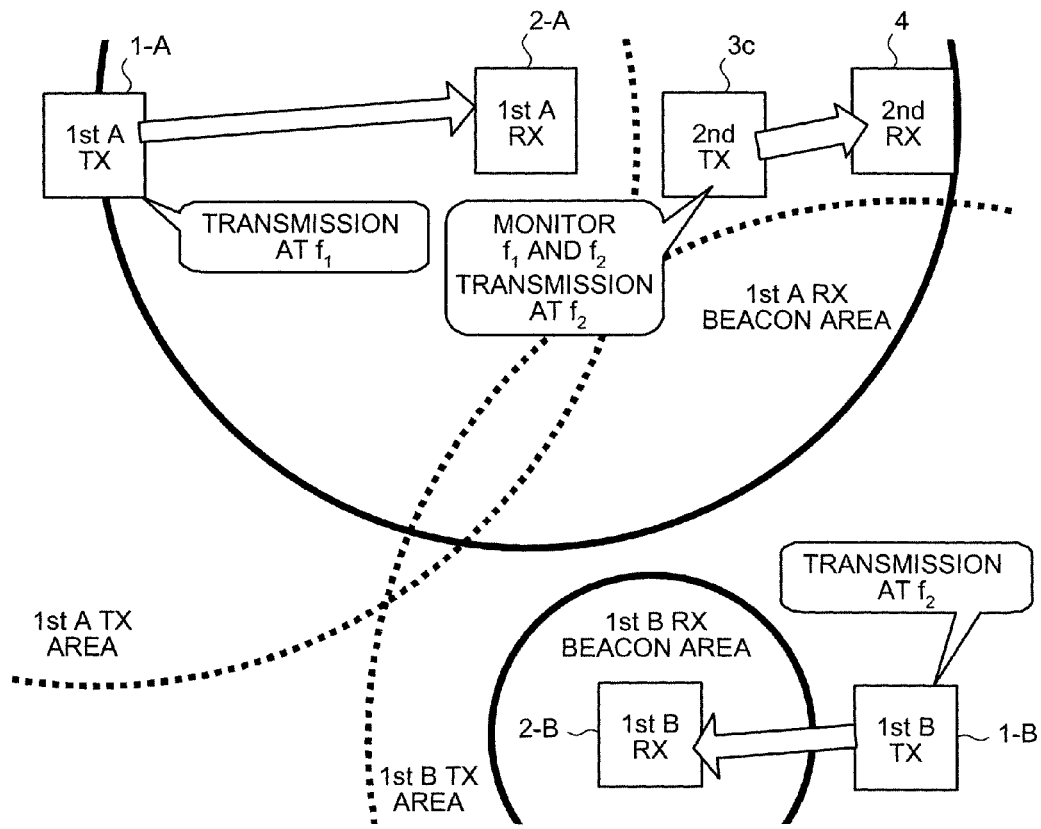
Figures 2, 4:
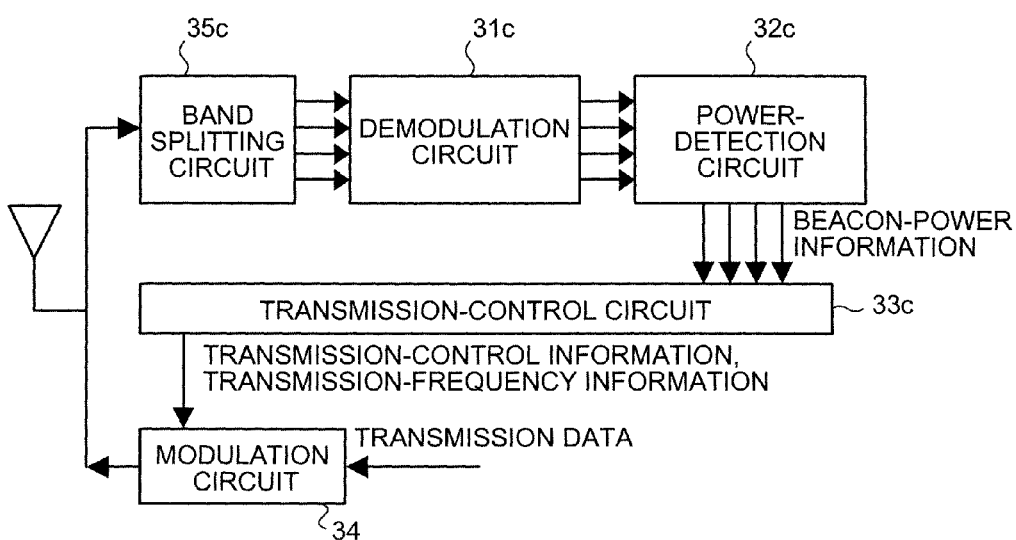
Figures 1, 5:
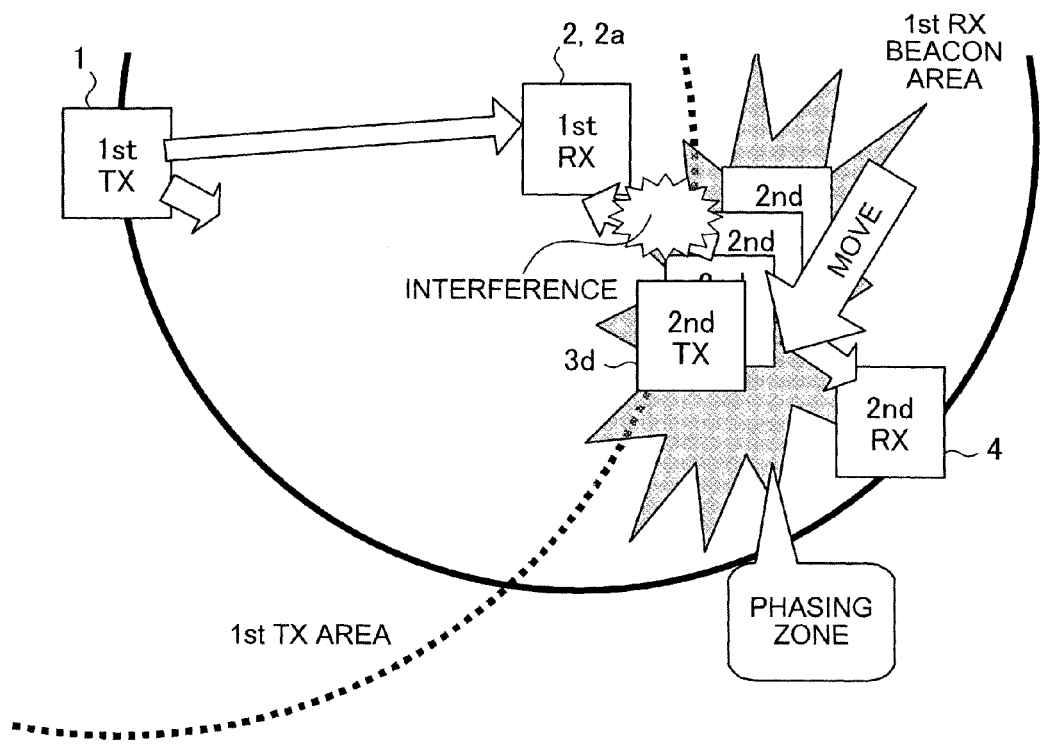
Figures 3, 5:
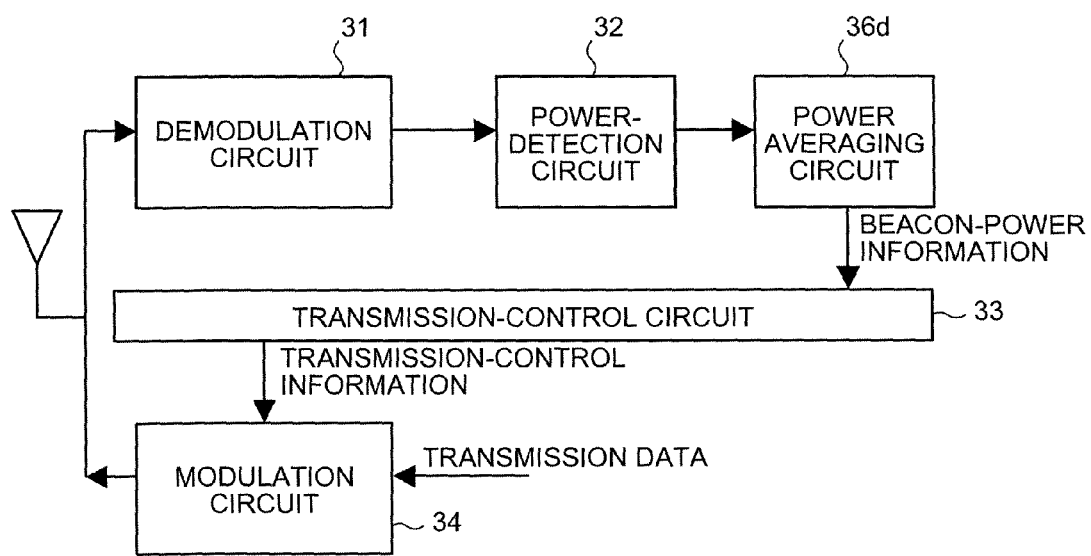
Figures 1, 6:
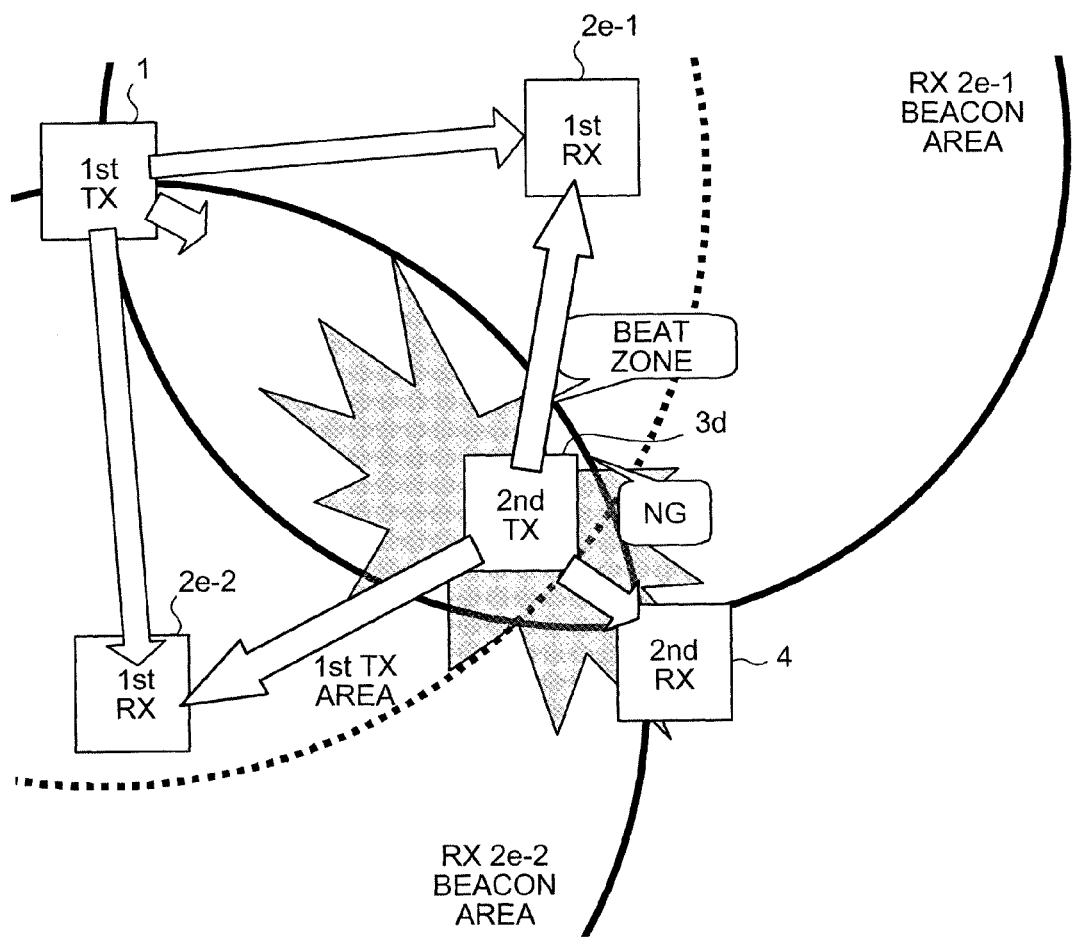
Figures 2, 6:
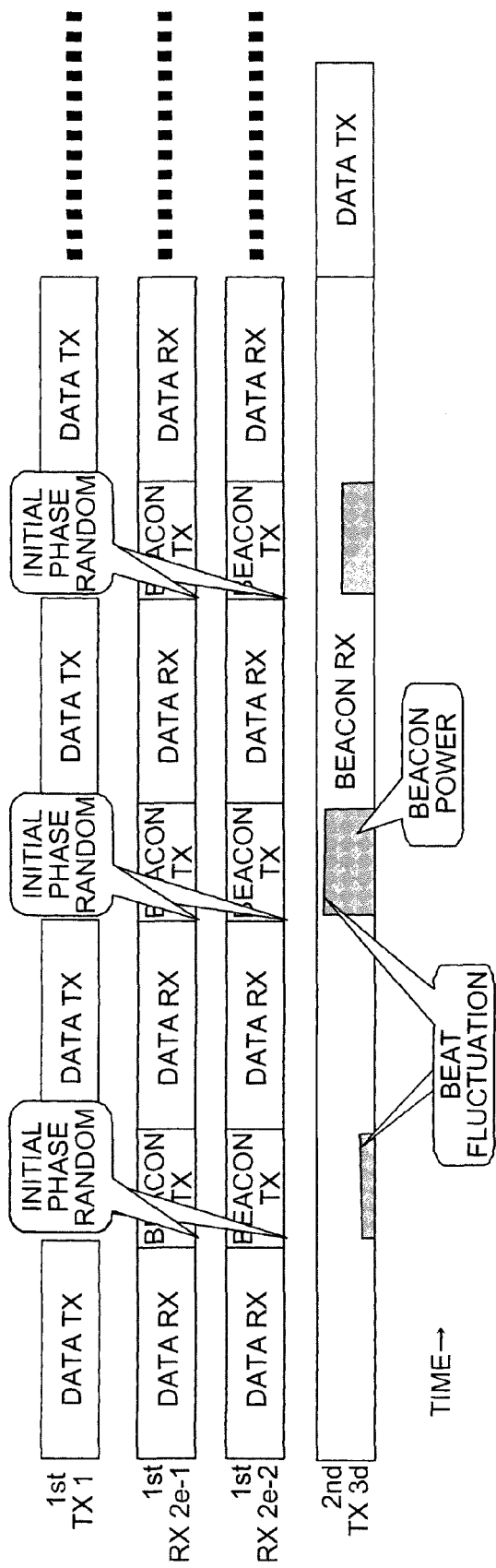
Figures 3, 6:
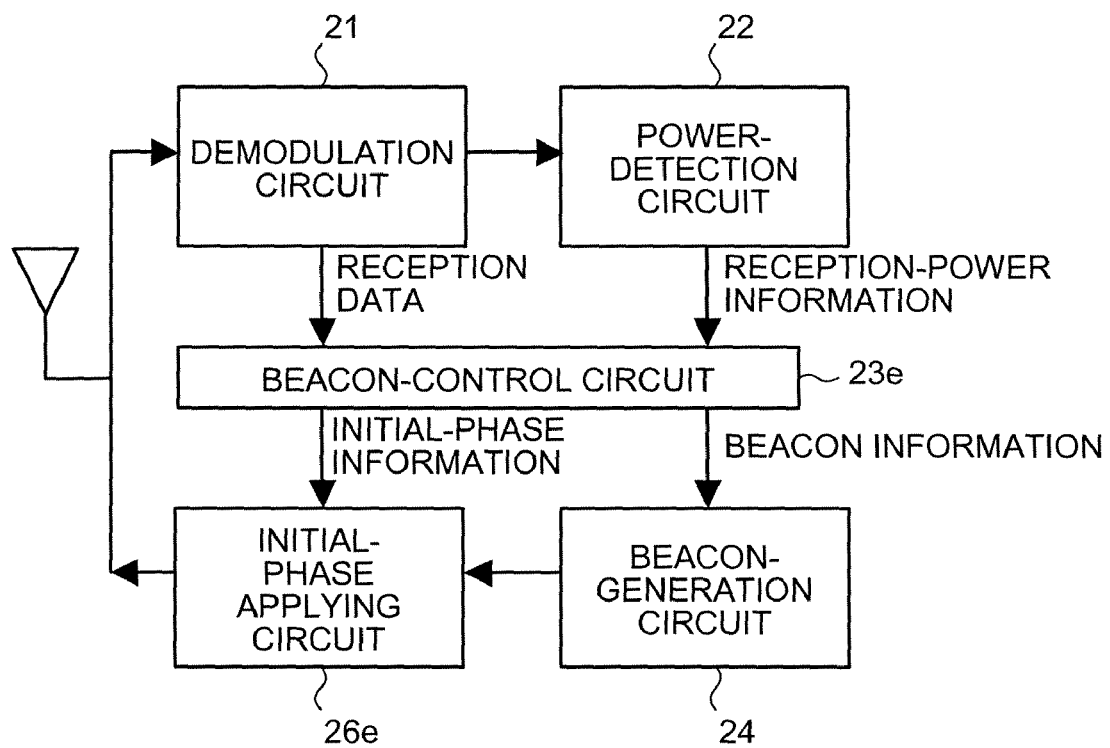

FIG. 6-1 is a diagram of an example structure of a frequency sharing radio system according to a sixth embodiment of the present invention. In FIG. 6-1, it is assumed that a plurality of receiving stations (a first RX 2e-1 and a first RX 2e-2 shown in FIG. 6-1) is present in the first system and a beat zone is formed in an environment in which beacon power of the first RX 2e-1 and beacon power of the first RX 2e-2 arrive with substantially the same amplitude. In an explanation of this embodiment, the second TX 3d is present in the beat zone. The first TX 1 of the first system and the respective apparatuses constituting the second system perform the same processing as that in the fifth embodiment described above.

In this embodiment, the respective first RXs of the first system have a function of transmitting signals using a random phase in every beacon-signal transmission in addition to the processing in the fifth embodiment described above.

The operation of the frequency sharing radio system according to this embodiment are explained. For example, when beacon signals transmitted from the first RX 2e-1 and the first RX 2e-2 arrive with substantially the same amplitude in the beat zone and phases of the two beacon signals are opposite, those beacon signals cancel each other. Thus, even when the second TX 1 is present at a point where the beacon signals arrive, it may be impossible to detect beacon power. Therefore, in this embodiment, the first RX 2e-1 and the first RX 2e-2 perform transmission using a random phase in every beacon-signal transmission.

FIG. 6-2 is a diagram for explaining fluctuation in beacon signals received by the second TX 3d. A phase of beacon signal of a first time changes to an opposite phase between the first RX 2e-1 and the first RX 2e-2 and reception power is hardly obtained. On the other hand, concerning beacon signals of second and third times, since the first RX 2e-1 and the first RX 2e-2 transmit initial phases of the beacon signals at random, phases of the beacon signals are prevented from changing to opposite phases. Thus, reception power is obtained in the second TX 3d. In this way, the second TX 1 detects the first RXs by receiving the beacon signals a plurality of times and detecting peak power of the beacon signals.

FIG. 6-3 is a diagram of an example structure of the first RX 2e-1 and the first RX 2e-2. The first RXs are characterized in that the first RXs include an initial-phase applying circuit 26e and a beacon-control circuit 23e outputs initial-phase information in addition to beacon information. Like reference characters refer to components corresponding to those of the first RX in the first embodiment described above, and explanations thereof are omitted. In this embodiment, the beacon-control circuit 23e and the initial-phase applying circuit 26e are applied to the structure of the first RX in the first embodiment. However, the present invention is not limited to this. It is also possible to apply the beacon-control circuit 23e and the initial-phase applying circuit 26e to the first RX in the second or third embodiment. In the following, processing different from that in the first, second, or third embodiment is explained.

The beacon-control circuit 23e notifies the initial-phase applying circuit 26e of the initial-phase information together with the beacon information described above. Examples of the initial-phase information include initial phase that changes at random in every beacon transmission. The initial-phase applying circuit 26 applies, based on the initial-phase information notified by the beacon-control circuit 23e, an initial phase to a transmission signal output by the beacon-generation circuit 24.

As described above, in this embodiment, the receiving stations of the first system transmit beacon signals having random initial phases, respectively, and the transmitting station of the second system performs beacon-signal detection a plurality of times and averages results of the beacon-signal detection. Consequently, even when a beat zone is generated, the transmitting station of the second system can detect the receiving stations of the first system without being affected by a phase relation of the beacon signals. Thus, it is possible to prevent interference with the first system.

Seventh Embodiment

Figures 1, 7:
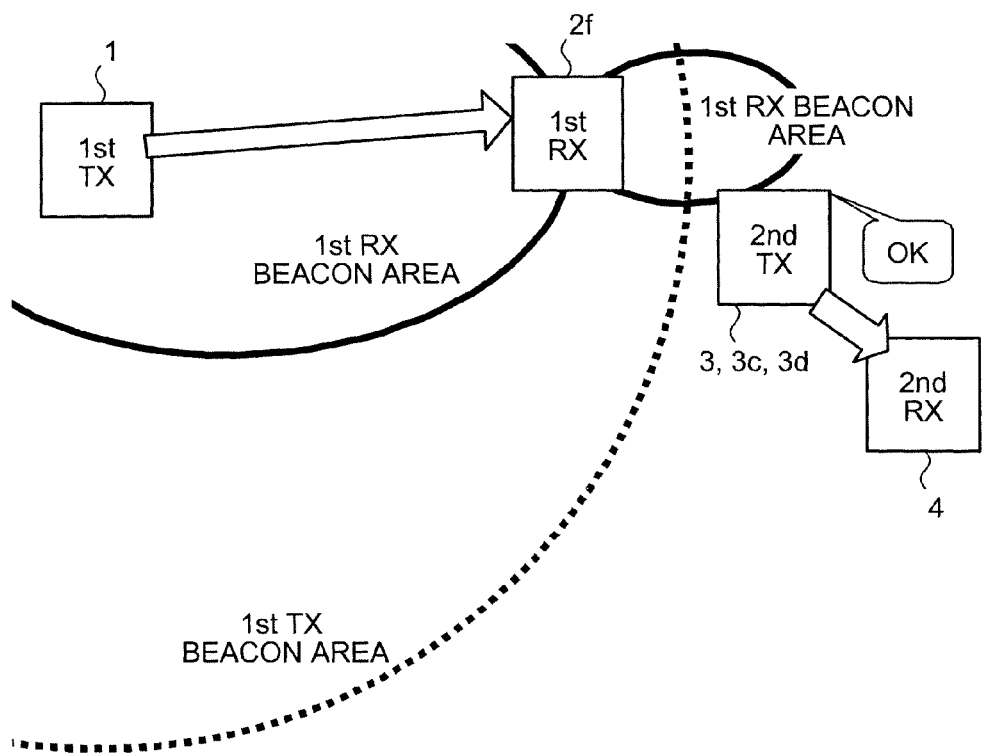
Figures 2, 7:
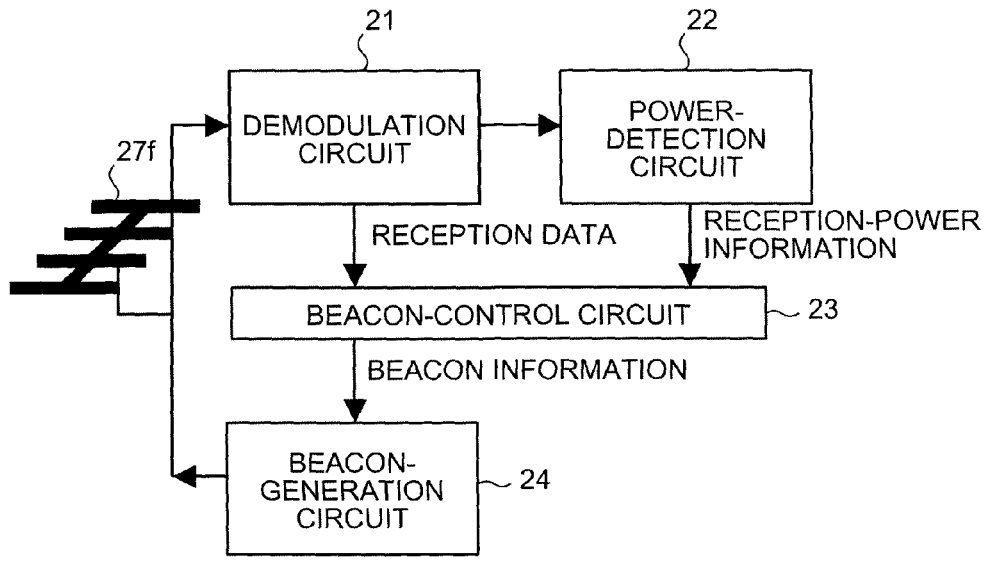
Figures 3, 7:
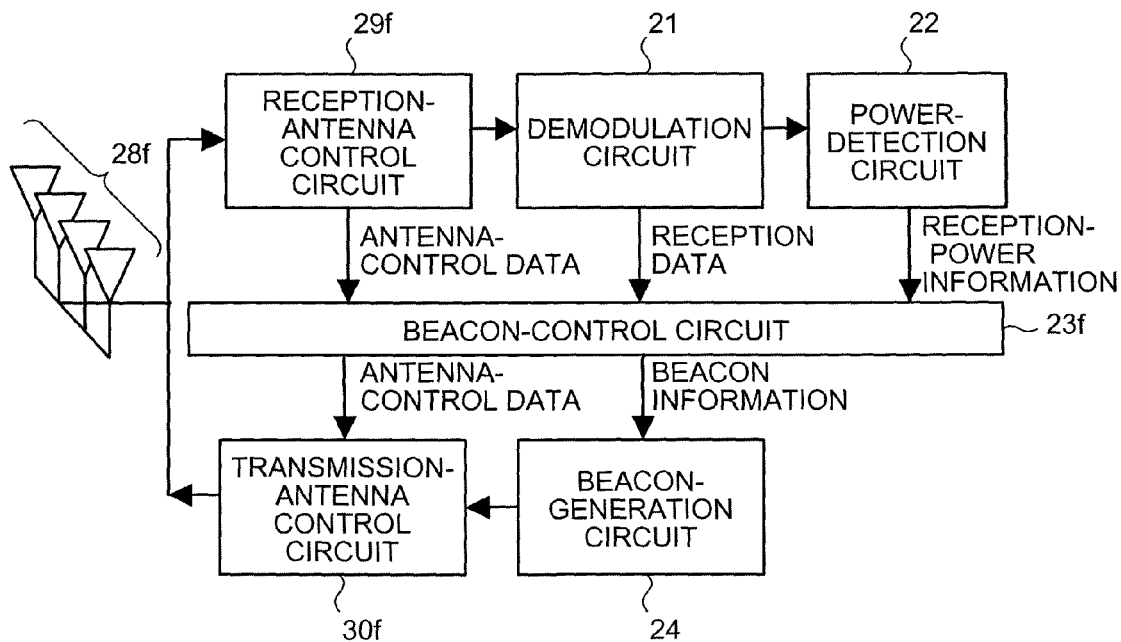

FIG. 7-1 is a diagram of an example structure of a frequency sharing radio system according to a seventh embodiment of the present invention. A first TX 1 and a first RX 2f represent an existing system (a first system) and a second TX (3, 3c, 3d) and a second RX 4 represent a new system (a second system). In FIG. 7-1, it is assumed that the first RX 2f includes a directional antenna. Apparatuses other than the first RX 2f constituting the systems perform the same processing as that described above in the first to sixth embodiments.

The operation of the frequency sharing radio system according to this embodiment are explained. For example, the first RX 2f includes a directional antenna. As shown in FIG. 7-1, the first RX 2f sets a reception range in the first TX 1 direction wide and sets a reception range in other directions narrow. The first RX 2f transmits a beacon signal using a directional pattern identical to a directional pattern used for reception. The beacon signal performs radio wave propagation based on the directional pattern. Consequently, the beacon signal realizes a reception range shown as a first RX beacon area in FIG. 7-1. Therefore, in FIG. 7-1, the second TX is on the outside of the reception range of the first RX 2f having directionality and can transmit a signal.

FIG. 7-2 is a diagram of an example structure of the first RX 2f. The first RX 2f is characterized by including a directional antenna 27f. Like reference characters refer to components corresponding to those of the first RX in the first embodiment described above, and explanations thereof are omitted. In this embodiment, the directional antenna 27f is applied to the structure of the first RX in the first embodiment. However, the present invention is not limited to this. It is also possible to apply the directional antenna 27f to the structure of the first RX in the second or third embodiment. In the following, processing different from that in the first to sixth embodiments is explained.

For example, the directional antenna 27 has a function of applying a directional pattern to an antenna radiation characteristic and outputs a signal received based on this directional pattern to the demodulation circuit 21. When the beacon-generation circuit 24 outputs a transmission signal to the directional antenna 27f, the directional antenna 27f performs transmission based on a directional pattern identical to the directional pattern of the reception. In other words, in the structure of FIG. 7-2, the directional antenna 27f transmits a beacon signal using a directional pattern identical to the directional pattern used for reception.

FIG. 7-3 is a diagram of an example structure of the first RX 2f that realizes equivalent processing with a structure different from that in FIG. 7-2. The first RX 2f is characterized by including a plurality of antennas 28f as antennas, a reception-antenna control circuit 29f, and a transmission-antenna control circuit 30f.

For example, the antennas 28f output reception signals of the respective antennas to the reception-antenna control circuit 29f. The reception-antenna control circuit 29f generates a directional pattern by combining the reception signals received from the antennas 28f according to signal processing, outputs the reception signal combined to the demodulation circuit 21, and further outputs antenna-control data used for the signal processing to the beacon-control circuit 23f.

The beacon-control circuit 23f outputs, based on the antenna-control data received from the reception-antenna control circuit 29f, antenna-control data for realizing a directional pattern identical to the directional pattern used for reception to the transmission-antenna control circuit 30f together with the reception data and the reception-power information described above. The transmission-antenna control circuit 30f creates, based on the antenna-control data received from the beacon-control circuit 23f, a directional pattern for a transmission signal output by the beacon-generation circuit 24 and outputs the directional pattern to the antennas 28f.

As described above, in this embodiment, the receiving station of the first system includes antennas having a directional pattern and transmits a beacon signal using a directional pattern identical to a directional pattern used for reception. Consequently, since it is possible to set a reception range in directions other than a direction of the transmitting station of the first system narrow, it is highly likely that the second system can be established.

Eighth Embodiment

Figures 1, 8:
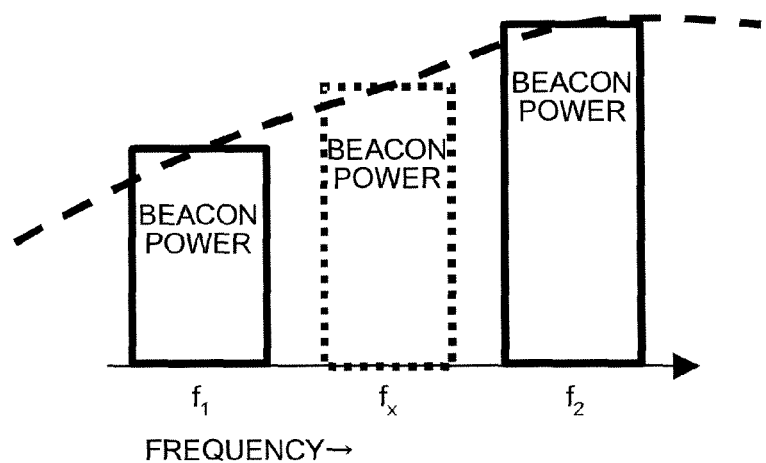
Figures 2, 8:
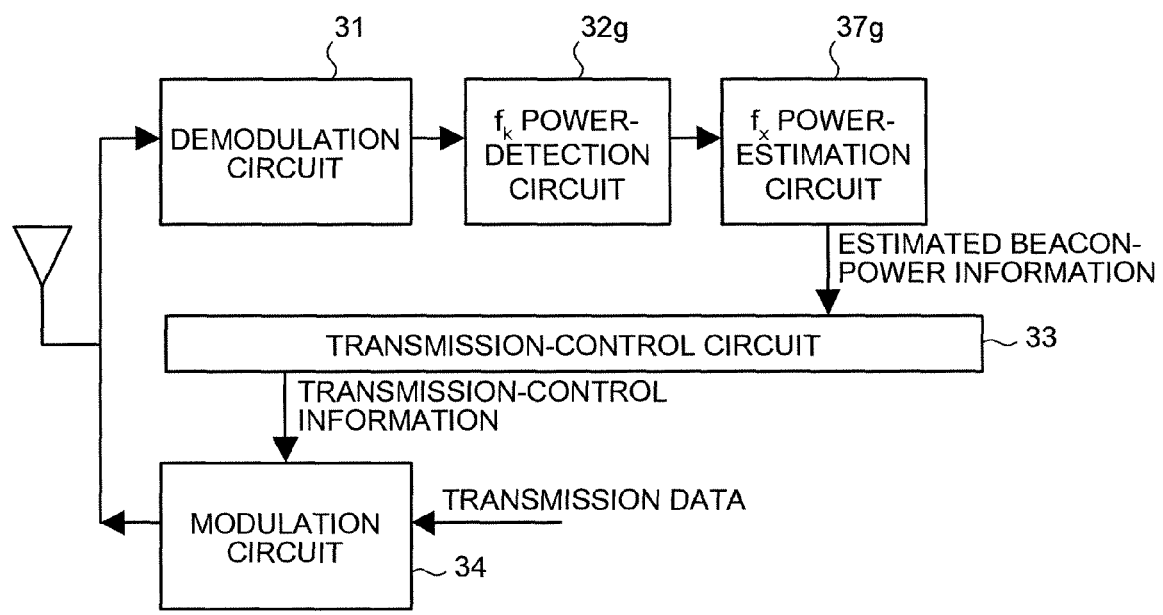

FIG. 8-1 is a diagram for explaining an example of power estimation processing for a beacon signal as a salient feature of an eighth embodiment of the present invention. In FIG. 8-1, $f_1$ and $f_2$ indicate frequencies of beacon signals received by the second TX and $f_x$ indicates a frequency of a signal transmitted by the second TX. In this embodiment, when a frequency of the beacon signal used in the first to seventh embodiments described above is different from a transmission frequency of the second TX, electric power of the beacon signal at the transmission frequency $f_x$ is estimated.

The operation of the radio frequency shared radio system according to this embodiment are explained. In the first to seventh embodiments described above, a frequency of a beacon signal transmitted by the first RX is identical to a transmission frequency of the second TX. In an explanation of this embodiment, a frequency $f_k$ (k=1, 2, ...) of a beacon signal transmitted by the first RX is different from the transmission frequency $f_x$ of the second TX. In this case, the second TX realizes, based on the beacon signal transmitted by the first RX at the frequency $f_k$, frequency sharing at the frequency $f_x$ used by the first TX and the second TX. In FIG. 8-1, electric power of a beacon signal at the transmission frequency $f_x$ is estimated based on electric power at the frequencies $f_1$ and $f_2$ of two beacon signals. A frequency sharing radio system same as that described above in the first to seventh embodiments is established using information on the estimated beacon power.

FIG. 8-2 is a diagram of an example structure of the second TX according to this embodiment. The second TX is characterized by including an $f_k$ power-detection circuit 32g and an $f_k$ power-estimation circuit 37g. Like reference characters refer to components corresponding to those of the second TX according to the first to seventh embodiments described above, and explanations thereof are omitted. In the following, processing different from that in the first to seventh embodiments is explained. In this embodiment, as an example, the $f_k$ power-detection circuit 32g and the $f_k$ power-estimation circuit 37g are applied to the structure in the first embodiment. However, it is also possible to apply the $f_k$ power-detection circuit 32g and the $f_k$ power-estimation circuit 37g in the second to seventh embodiments by using the same structure.

The $f_k$ power-detection circuit 32g detects electric power of the frequency $f_k$ (k=1, 2, ...) based on a reception signal output from the demodulation circuit 31 and outputs beacon-power information to the $f_x$ power-estimation circuit 37g. The $f_x$ power-estimation circuit 37g estimates beacon power at the frequency $f_x$ based on the beacon-power information output from the $f_k$ power-detection circuit 32g. For example, when there is no large frequency selectivity between the frequency $f_k$ and the frequency $f_x$, it is possible to uniquely estimate beacon power of the frequency $f_x$ by applying nth order interpolation to data of the frequency $f_k$ (k=1, 2, ..., n). After that, the transmission-control circuit 33 generates transmission-control information according to the same processing as that described above in the embodiments.

As described above, in this embodiment, when a beacon frequency of the receiving station of the first system and a transmission frequency of the transmitting station of the second system are different, the transmitting station of the second system estimates beacon power of the transmission frequency from beacon power received. Consequently, it is possible to establish the second system without affecting the first system.

Ninth Embodiment

Figures 1, 9:
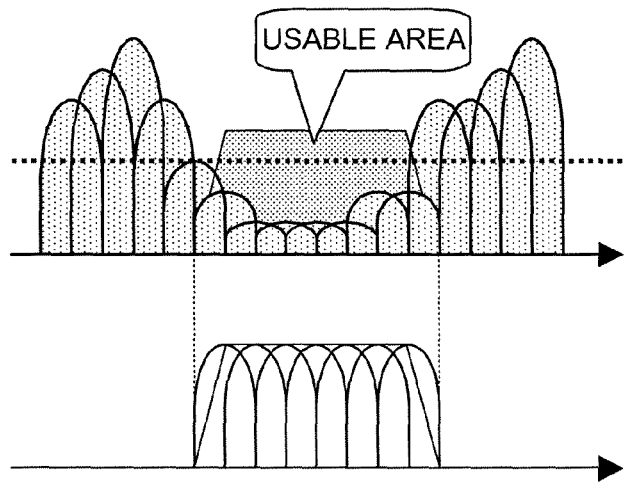
Figures 2, 9:
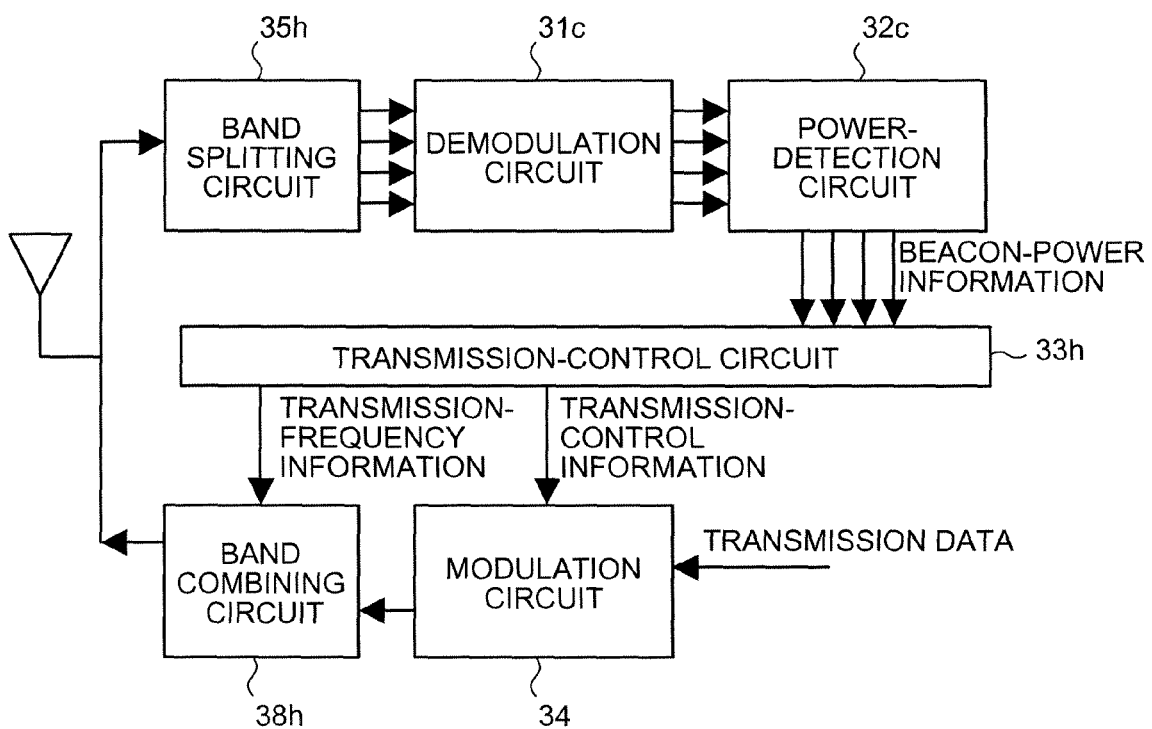

FIG. 9-1 is a diagram of an example of spectra of a beacon signal and a transmission signal as a salient feature of a ninth embodiment of the present invention. An upper section of FIG. 9-1 indicates a bacon signal output by the first RX at the time when the beacon signal is received by the second TX and a lower section of FIG. 9-1 indicates a transmission signal of the second TX. In this embodiment, a frequency band of the first system is split, beacon signals are received in respective frequency bands, and transmission using a plurality of frequency bands is performed in the second system.

As an example, it is assumed that the first system adopts the orthogonal frequency division multiplexing (OFDM) system and the multi-carrier system. In this case, the receiving station of the first system transmits a beacon signal for each subcarrier.

The operation of the frequency sharing radio system according to this embodiment are explained. For example, when a beacon signal transmitted from the first RX is a multicarrier signal, the second TX receives beacon signals in respective frequency bands by performing band splitting. For example, when frequency phasing is assumed, as shown in FIG. 9-1, a difference occurs in beacon power received by the second TX in the respective frequency bands. In this case, the second TX is capable of performing transmission using a plurality of frequency bands having sufficiently small beacon power.

FIG. 9-2 is a diagram of an example structure of the second TX according to this embodiment. The second TX is characterized by including a band splitting circuit 35h and a band combining circuit 38h and outputting transmission-frequency information using a transmission-control circuit 33h. Like reference characters refer to components corresponding to those of the second TX according to the first to eighth embodiments described above, and explanations thereof are omitted. In the following, processing different from that in the first to eighth embodiments described above is explained. In this embodiment, as an example, the band splitting circuit 35h and the band combining circuit 38h are applied to the structure in the first embodiment. However, it is also possible to apply the band splitting circuit 35h and the band combining circuit 38h to the second to seventh embodiments by using the same structure.

The band splitting circuit 35h subjects a reception signal to band splitting and separates beacon signals received at a plurality of frequencies. For example, when an assumed reception signal is an OFDM signal, the band splitting circuit 35h can be realized by a Fourier transform circuit (FFT).

The transmission-control circuit 33h calculates a frequency usable in the second system based on beacon-power information in a plurality of frequencies in addition to the transmission-control information described above and generates transmission-frequency information as a result of the calculation. The transmission-frequency information is output to the band combining circuit 38h and the transmission-control information is output to the modulation circuit 34.

The band combining circuit 38h subjects a transmission signal generated by the modulation circuit 34 to band combination based on the transmission-frequency information output from the transmission-control circuit 33h and generates a multicarrier signal. When an assumed transmission signal is an OFDM signal, the band combining circuit 38h can be realized by an inverse Fourier transform circuit (IFFT).

As described above, in this embodiment, the transmitting station transmits a signal only at a frequency usable in the second system. In other words, when the first system adopts the multi-carrier system and the receiving station of the first system transmits a beacon signal for each subcarrier, the transmitting station of the second system detects the beacon signal for each subcarrier, detects a usable frequency band, and transmits a signal using this frequency band. Consequently, when frequency selectivity phasing occurs, it is possible to establish the second system without affecting the first system.

Tenth Embodiment

Figures 1, 10:
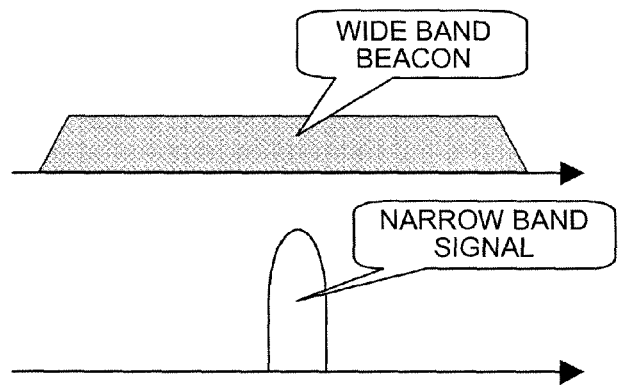
Figures 2, 10:
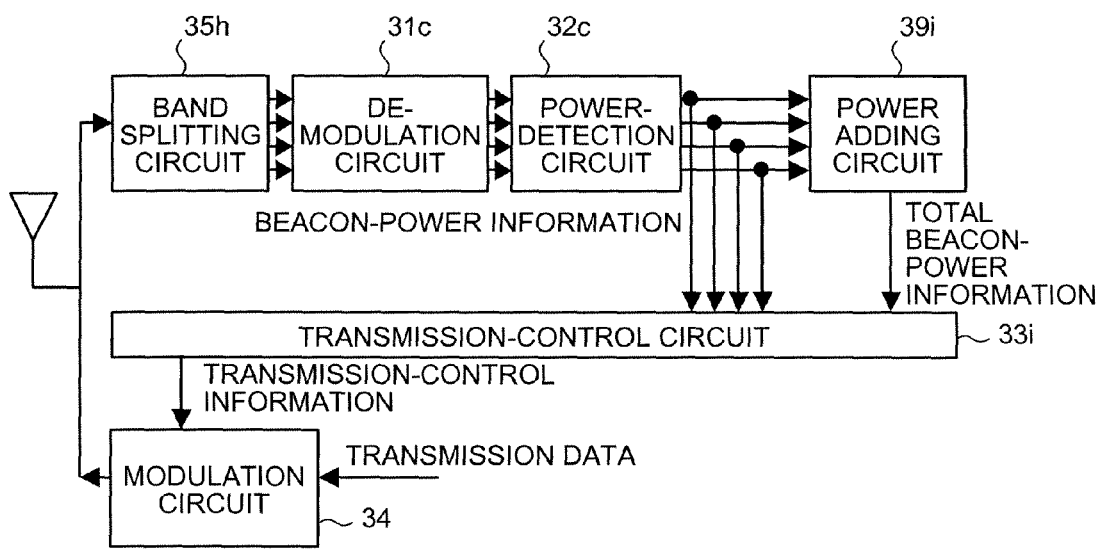

FIG. 10-1 is a diagram of an example of spectra of a beacon signal and a transmission signal as a salient feature of a tenth embodiment of the present invention. An upper section of FIG. 10-1 indicates a beacon signal output by the first RX at the time when the beacon signal is received by the second TX and a lower section of FIG. 10-1 indicates a transmission signal of the second TX. In this embodiment, the second TX of the second system transmits a signal having a sufficiently narrow band compared with a frequency band used by the first system and sufficiently small electric power.

As an example, it is assumed that the first system adopts a wide-band modulation system (the ultra wide band (UWB), the spread spectrum (SS) system, the frequency hopping (FH), the code division multiplexing (CDM) system, etc.). In this case, the receiving station of the first system transmits beacon signals over all bands of the system as beacon signals.

The operation of the frequency sharing radio system according to this embodiment are explained. For example, when a beacon signal transmitted from the first RX is a wideband signal, the second TX receives beacon signals in respective frequency bands by performing band splitting. The second TX calculates total signal power received by the first RX by combining the beacon signals in the respective frequency bands. The second TX transmits a signal having a sufficiently narrow band compared with the wideband signal and sufficiently small electric power compared with the total signal power received by the first RX. In this case, it is likely that the narrow band signal transmitted by the second TX interferes with the first RX. However, since this interference is sufficiently small compared with the total signal power received by the first RX, the first system can prevent an influence of the interference by using characteristics of the wideband signal.

FIG. 10-2 is a diagram of an example structure of the second TX according to this embodiment. The second TX is characterized by including a power adding circuit 39i. Like reference characters refer to components corresponding to those of the second TX according to the first to ninth embodiments described above, and explanations thereof are omitted. In the following, processing different from that in the first to ninth embodiments described above is explained. In this embodiment, as an example, the power adding circuit 39i is applied to the structure of the first embodiment. However, it is also possible to apply the power adding circuit 39i to the second to seventh embodiments by using the same structure.

The power adding circuit 39i adds up beacon-power information corresponding to a plurality of frequencies output from the power-detection circuit 32c and outputs total beacon-power information to a transmission-control circuit 33i. The total beacon-power information corresponds to the total signal power received by the first RX of the first system.

The transmission-control circuit 33i calculates a band of a beacon signal based on the beacon-power information corresponding to the frequencies obtained from the power-detection circuit 32c and calculates an allowable band of the second system. The transmission-control circuit 33i calculates allowable transmission power of the second system based on the total beacon-power information obtained from the power adding circuit 39i. The transmission-control circuit 33i creates transmission-control information from the information obtained and outputs the transmission-control information to the modulation circuit 34.

As described above, in this embodiment, the transmitting station of the second system transmits a signal having a sufficiently narrower band than that in the first system and sufficiently small total signal power compared with the total signal power received by the receiving station of the first system. In other words, when the first system adopts the wide-band modulation system and the receiving station of the first system transmits a beacon signal of a wideband signal, the transmitting station of the second system detects total signal power of beacons and transmits a signal having a sufficiently narrow band compared with the band used by the first system and sufficiently small electric power compared with the total signal power detected. Consequently, when the first system adopts the wide-band modulation system, it is possible to establish the second system without affecting the first system.

Eleventh Embodiment

Figures 1, 11:
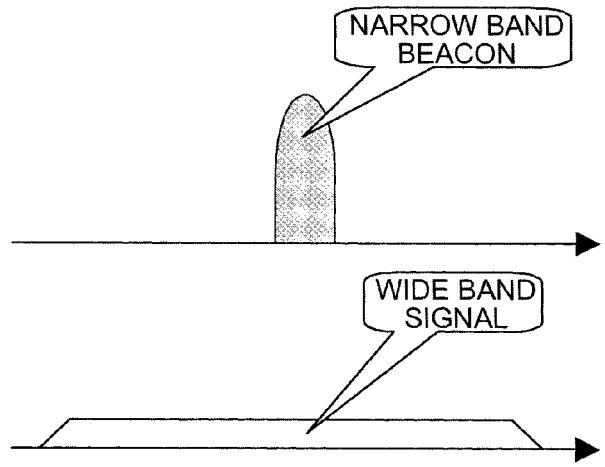
Figures 2, 11:
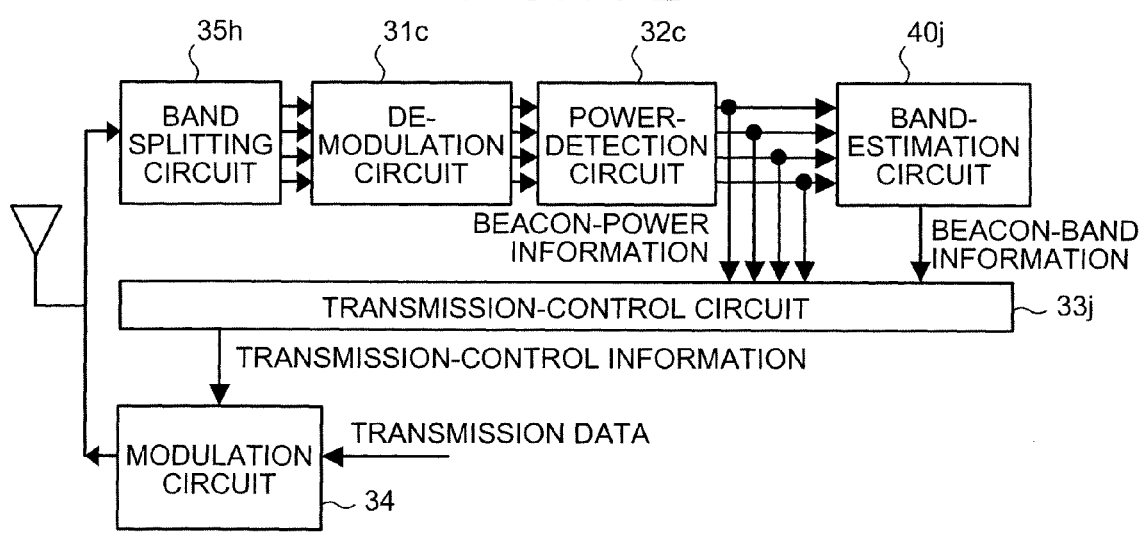

FIG. 11-1 is a diagram of an example of spectra of a beacon signal and a transmission signal as a salient feature of an eleventh embodiment of the present invention. An upper section of FIG. 11-1 indicates a beacon signal output by the first RX at the time when the beacon signal is received by the second TX and a lower section of FIG. 11-1 indicates a transmission signal of the second TX. In this embodiment, the second TX of the second system transmits a signal having a sufficiently wider band than the band used by the first system.

As an example, it is assumed that the second system adopts a wide-band modulation system (the ultra wide band (UWB), the spread spectrum (SS) system, the frequency hopping (FH), and the code division multiplexing (CDM) system, etc.).

The operation of the frequency sharing radio system according to this embodiment are explained. For example, when a beacon signal transmitted from the first RX is a narrow band signal, the second TX applies band splitting to a band (a wide band) in which transmission is performed and receives beacon signals in respective frequency bands. The second TX estimates a band of a beacon signal output by the first RX based on the beacon signals included in the respective frequency bands. The second TX transmits a signal in a sufficiently wide band compared with the narrow band signal received by the first RX (the band used in the first system). In this case, the second TX transmits a sufficiently small signal compared with the total signal power received by the first RX. Consequently, it is likely that a condition "total transmission power of the second TX is sufficiently small compared with total signal power received by the first RX" is not satisfied. However, since the first RX receives only the narrow band used in the first system, the wideband signal from the second system does not interfere with the first system.

FIG. 11-2 is a diagram of an example structure of the second TX according to this embodiment. The second TX is characterized by including a band-estimation circuit 40*j*. Like reference characters refer to components corresponding to those of the second TX according to the first to tenth embodiments described above, and explanations thereof are omitted. In the following, processing different from that in the first to tenth embodiments is explained. In this embodiment, as an example, the band-estimation circuit 40*j* is applied to the structure of the first embodiment. However, it is also possible to apply the band-estimation circuit 40*j* to the second to seventh embodiments by using the same structure.

The band-estimation circuit 40*j* estimates a band of a beacon signal of the first system based on beacon-power information corresponding to a plurality of frequencies output from the power-detection circuit 32*c* and outputs beacon-band information to a transmission-control circuit 33*j* as a result of the estimation.

The transmission-control circuit 33*j* estimates a usable frequency band based on the beacon-power information corresponding to the frequencies obtained from the power-detection circuit 32*c*. The transmission-control circuit 33*j* calculates a signal band and signal power transmittable in the second system based on the beacon-band information obtained from the band-estimation circuit 40*j*. The transmission-control circuit 33*j* creates transmission-control information based on these kinds of information and outputs the transmission-control information to the modulation circuit 34.

As described above, in this embodiment, the transmitting station of the second system transmits a signal not interfering with the receiving station of the first system in a sufficiently wider band than that of the first system. In other words, when the second system adopts the wide-band modulation system, the transmitting station of the second system detects beacon signals over a wide band, estimates a band of a beacon signal of the first system, and transmits a signal having a sufficiently wide band compared with the band used by the first system. Consequently, when the first system adopts the narrow-band modulation system, it is possible to establish the second system without affecting the first system.

Twelfth Embodiment

Figures 1, 12:
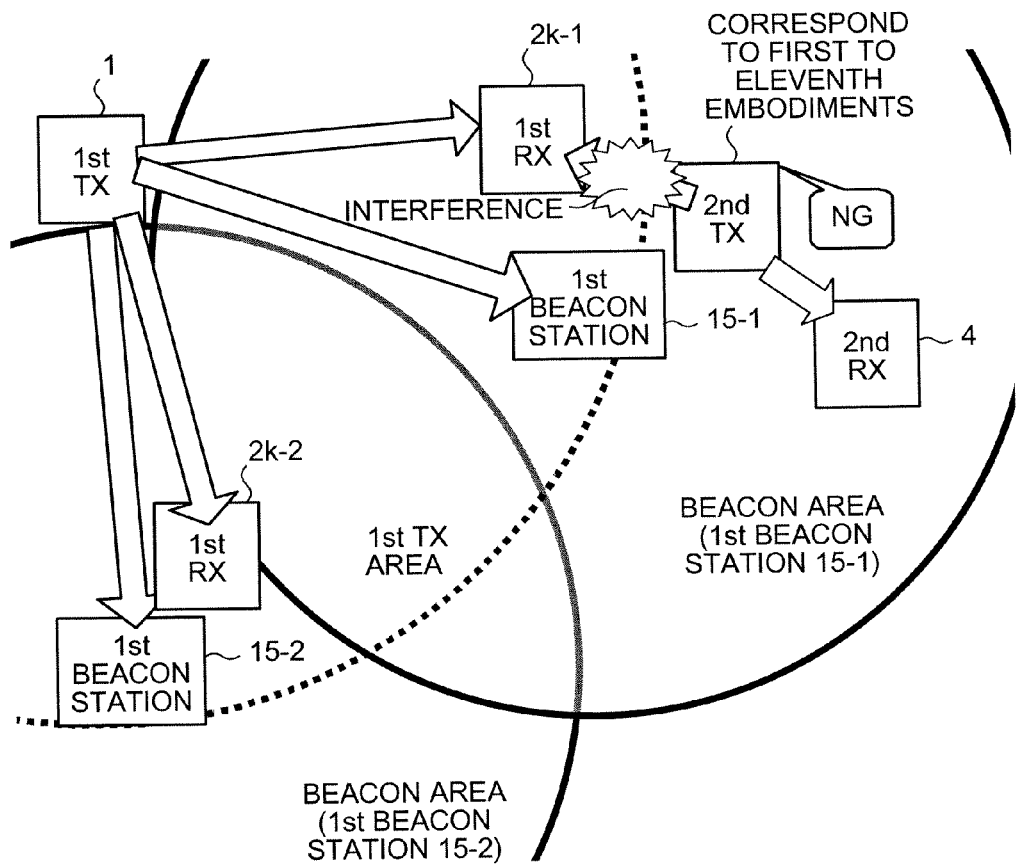
Figures 2, 12:
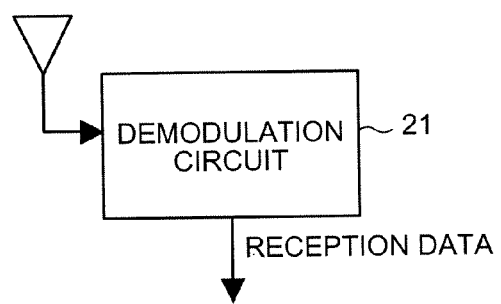

FIG. 12-1 is a diagram of an example structure of a frequency sharing radio system according to a twelfth embodiment of the present invention. A first RX 2*k*-1 and a first RX 2*k*-2 are receiving stations of the first system not having a beacon transmission function. A first beacon station 15-1 and a first beacon station 15-2 are receiving stations of the first system having the beacon transmission function. This embodiment is characterized by further including receiving stations of the first system not having the beacon transmission function and receiving stations of the first system having the beacon transmission function. Like reference characters refer to components corresponding to those described above in the first to eleventh embodiments, and explanations thereof are omitted.

As an example, it is assumed that the first system is a system for broadcasts such as a television broadcast. In that case, the first RX 2*k*-1 and the first RX 2*k*-2 correspond to televisions or the like in homes and are assumed to not have the beacon transmission function. In such a case, for example, the first beacon station 15-1 and the first beacon station 15-2 having the beacon transmission function are set separately.

The operation of the frequency sharing radio system according to this embodiment are explained. For example, the first RX 2*k*-1 and the first RX 2*k*-2 have a function of receiving a signal of the first TX 1 but do not have a function of transmitting a beacon corresponding to the signal. On the other hand, the first beacon station 15-1 and the first beacon station 15-2 have a function of receiving a signal of the first TX 1 and transmitting a beacon signal corresponding to the signal. It is conceivable to set such receiving stations having the beacon transmission function in, as an example, at an area end of the first TX area, near a receiving station not having the beacon transmission function, a random position in the first TX area, or the like.

Therefore, the second TX cannot detect the first RX 2*k*-1 and the first RX 2*k*-2 not having the beacon transmission function. However, since it is possible to detect the first beacon station 15-1 and the first beacon station 15-2 having the beacon transmission function, it is possible to realize a frequency sharing system by, for example, distributing the first beacon stations at a predetermined ratio.

FIG. 12-2 is a diagram of an example structure of the first RX 2*k*-1 and the first RX 2*k*-2. The first RX according to this embodiment needs only the demodulation circuit 21 for reception and does not need circuits such as a power-detection circuit, a beacon-control circuit, and a beacon-generation circuit. The first beacon station 15-1 and the first beacon station 15-2 are constituted as shown in FIG. 1-4 described above.

As described above, in this embodiment, even when there is a receiving station not having the beacon transmission function in the first system, receiving stations having the beacon transmission function are distributed at a predetermined rate in the first TX area. Thus, it is possible to provide a frequency sharing radio system that realizes establishment of the second system without affecting the first system.

INDUSTRIAL APPLICABILITY

As described above, the frequency sharing method according to the present invention is suitably applied to a frequency sharing radio system that realizes effective use of frequency resources and, particularly, to a frequency sharing radio system in which a new system is established without interference with existing systems.

The invention claimed is:

1. A frequency sharing method for a second system using a frequency that a first system uses, comprising:
   receiving, by a receiving station of the first system, a signal from a transmitting station of the first system at a transmission frequency;
   transmitting, by the receiving station of the first system, a beacon signal indicating a reception range of the receiving station at the transmission frequency, the beacon signal including beacon information that includes at least one of modulation information, transmission-power information, and priority information related to the first system;
   detecting, by a transmitting station of the second system, the beacon signal transmitted from the receiving station of the first system; and
   judging, by the transmitting station of the second system, whether signal transmission from the transmitting station of the second system to a receiving station of the second system, which did not transmit the beacon signal, is possible at the transmission frequency used by the first system without interfering with the first system, based on the beacon information of the first system included in the beacon signal.

2. The frequency sharing method according to claim 1, wherein, the transmitting includes transmitting the beacon signal with power corresponding to reception power of the signal received from the transmitting station of the first system.

3. The frequency sharing method according to claim 1, further comprising:
performing transmission control, at the transmitting station, based on the beacon information.

4. The frequency sharing method according to claim 1, wherein,
there is a plurality of first systems using different frequencies,
the detecting includes detecting a beacon signal in a plurality of frequency bands, and
in the judging, a frequency with lowest beacon power is set as a transmission frequency.

5. The frequency sharing method according to claim 1, wherein, the detecting includes detecting a beacon signal a plurality of times, the frequency sharing method further comprising:
averaging, by the transmitting station of the second system, results obtained at the detecting, wherein
the judging includes judging whether signal transmission is possible based on a result obtained at the averaging.

6. The frequency sharing method according to claim 1, wherein, the transmitting includes transmitting each beacon signal at a random phase.

7. The frequency sharing method according to claim 1, wherein, the transmitting includes:
creating a directional pattern for setting the reception range wider in a direction of the transmitting station of the first system and setting the reception range narrower in other directions; and
transmitting the beacon signal using the directional pattern.

8. The frequency sharing method according to claim 1, wherein,
the transmitting includes transmitting beacon signals at a plurality of frequencies different from a transmission frequency used by the transmitting station of the second system to communicate with the receiving station of the second system which did not transmit the beacon signal, and
the judging includes estimating power of a beacon signal at the transmission frequency of the transmitting station of the second system based on the beacon signals with the frequencies different from the transmission frequency of the transmitting station of the second system, and judges whether signal transmission is possible based on a result obtained at the estimating.

9. The frequency sharing method of claim 1, further comprising:
extracting, at the transmitting station of the second system, each subcarrier of the beacon signal; and
transmitting, at the transmitting station of the second system, signals using a plurality of frequency bands in which beacon-signal power is less than a predetermined value.

10. A frequency sharing method for a second system using a frequency that a first system uses, comprising:
receiving, by a receiving station of the first system, a signal from a transmitting station of the first system at a transmission frequency;
transmitting, by the receiving station of the first system, a beacon signal indicating a reception range of the receiving station at the transmission frequency, wherein the beacon signal is a wideband signal;
detecting, by a transmitting station of the second system, the beacon signal transmitted from the receiving station of the first system;
judging, by the transmitting station of the second system, whether signal transmission is possible based on a result obtained at the detecting;
calculating, by the transmitting station of the second system, a frequency band available for the second system to perform transmission based on beacon signals over a wide frequency band and total power of the beacon signals; and
transmitting, at the transmitting station of the second system, based on a result obtained at the calculating, a signal with a power lower than the total power using a frequency band narrower than a frequency band used by the first system.

11. A frequency sharing method for a second system using a frequency that a first system uses, comprising:
receiving, by a receiving station of the first system, a signal from a transmitting station of the first system at a transmission frequency;
transmitting, by the receiving station of the first system, a beacon signal indicating a reception range of the receiving station at the transmission frequency, wherein the beacon signal is a narrow band signal;
detecting, by a transmitting station of the second system, the beacon signal transmitted from the receiving station of the first system;
judging, by the transmitting station of the second system, whether signal transmission is possible based on a result obtained at the detecting;
estimating, by the transmitting station of the second system, a frequency band and power of the beacon signal; and
transmitting, at the transmitting station of the second system, based on a result obtained at the estimating, a signal with a power lower than the power of the beacon signal using a frequency band wider than a frequency band used by the first system.

12. A frequency sharing method for a second system using a frequency that a first system uses, comprising:
receiving, by a receiving station of the first system, a signal from a transmitting station of the first system at a transmission frequency;
transmitting, by the receiving station of the first system, a beacon signal indicating a reception range of the receiving station at the transmission frequency;
detecting, by a transmitting station of the second system, the beacon signal transmitted from the receiving station of the first system; and
judging, by the transmitting station of the second system, whether signal transmission is possible based on a result obtained at the detecting;
wherein, in the first system that includes a receiving station not having a function of transmitting a beacon signal, receiving stations having a function of transmitting a beacon signal are distributed at a predetermined ratio.

13. A transmitting station of a second system that uses a frequency that a first system uses, the transmitting station comprising:
a transmission control unit that detects a beacon signal indicating a reception range of a receiving station of a first system transmitted from the receiving station of the first system at a transmission frequency used by the first system, said beacon signal including beacon information that include at least one modulation information, transmission-power information, and priority information related to the first system, wherein the transmission control unit judges whether signal transmission from transmission station of the second system to a receiving station of the second system, which did not transmit the beacon signal, at the transmission frequency used by the first system without interfering with the first system, based on the beacon information of the first system included in the beacon signal, and generates transmission-control information including a result of the judgment; and a transmitting unit that transmits a signal based on the transmission-control information.

14. The transmitting station according to claim 13, wherein,
the transmission control unit detects a beacon signal in a plurality of frequency bands.

15. The transmitting station according to claim 13, wherein, the transmission control unit detects a beacon signal a plurality of times, averages results of detection, and judges whether signal transmission is possible based on an average of the results.

16. The transmitting station according to claim 13, wherein, when the receiving station of the first system transmits beacon signals at a plurality of frequencies different from a transmission frequency used by the transmitting station of the second system to communication with the receiving station of the second system which did not transmit the beacon signal, the transmission control unit estimates power of a beacon signal at the transmission frequency of the transmitting station of the second system based on the beacon signals with the frequencies different from the transmission frequency of the transmitting station of the second system, and judges whether signal transmission is possible based on a result of estimation.

17. The transmitting station according to claim 13,
wherein the transmission control unit generates the transmission-control information for causing the transmitting unit to transmit signals using a plurality of frequency bands in which beacon-signal power is less than a predetermined value.

18. A transmitting station of a second system in a frequency sharing radio system that uses a frequency that a first system uses, the transmitting station comprising:
a transmission control unit that detects a beacon signal indicating a reception range of a receiving station of the first system transmitted from the receiving station at a frequency used by the first system, judges whether signal transmission is possible based on a result of the detection, and generates transmission-control information including a result of the judgment, wherein the beacon signal is a wideband signal; and a transmitting unit that transmits a signal based on the transmission-control information, wherein the transmission control unit calculates total power of beacon signals over a wide frequency band, and generates the transmission-control information for causing the transmitting unit to transmit a signal with a power lower than the total power using a frequency band narrower than a frequency band used by the first system.

19. A transmitting station of a second system in a frequency sharing radio system that uses a frequency that a first system uses, the transmitting station comprising:
a transmission control unit that detects a beacon signal indicating a reception range of a receiving station of the first system transmitted from the receiving station at a frequency used by the first system, judges whether signal transmission is possible based on a result of the detection, and generates transmission-control information including a result of the judgment, wherein the beacon signal is a narrow band signal; and a transmitting unit that transmits a signal based on the transmission-control information, wherein the transmission control unit generates the transmission-control information for causing the transmitting unit to transmit a signal with a power lower than power of the beacon signal using a frequency band wider than a frequency band used by the first system.

* * * * *